United States Patent
Saha et al.

(10) Patent No.: US 10,355,938 B2
(45) Date of Patent: Jul. 16, 2019

(54) WI-FI ACCESS POINT PERFORMANCE MANAGEMENT

(71) Applicant: Accenture Global Services Limited, Dublin (IE)

(72) Inventors: Vivek Saha, Gurgaon (IN); Arnab Chakraborty, Sulzbach (DE); Sachin Sehgal, Gurgaon (IN); Ankit Jain, New Delhi (IN); Eric Bertrand, Montreal (CA); Amit Kumar, New Delhi (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 111 days.

(21) Appl. No.: 15/180,975

(22) Filed: Jun. 13, 2016

(65) Prior Publication Data

US 2016/0373306 A1    Dec. 22, 2016

(30) Foreign Application Priority Data

Jun. 22, 2015   (IN) ............................ 3103/CHE/2015

(51) Int. Cl.
*H04L 12/24*    (2006.01)
*H04W 24/08*   (2009.01)
(Continued)

(52) U.S. Cl.
CPC .............. *H04L 41/12* (2013.01); *H04L 41/06* (2013.01); *H04W 4/80* (2018.02); *H04W 24/08* (2013.01); *H04W 84/12* (2013.01); *H04W 88/08* (2013.01)

(58) Field of Classification Search
CPC ...................................................... H04L 41/12
(Continued)

(56) References Cited

U.S. PATENT DOCUMENTS 6,353,902 B1    3/2002   Kulatunge et al.
2004/0236547 A1*  11/2004   Rappaport ............ G06F 17/509
                                                                703/2
(Continued)

FOREIGN PATENT DOCUMENTS

| CN | 101541027 A | 9/2009 |
| EP | 2871803 | 5/2015 |
| WO | 2013/135734 | 9/2013 |

OTHER PUBLICATIONS

Amit P. Jardosh et al., "SCUBA: Focus and Context for Real-Time Mesh Network Health Diagnosis", Apr. 5, 2007, Passive and Ective Network Measurement; Springer Berlin Heidelberg, Berlin, pp. 162-171.
(Continued)

*Primary Examiner* — David R Lazaro
*Assistant Examiner* — Zia Khurshid
(74) *Attorney, Agent, or Firm* — Mannava & Kang, P.C.

(57) ABSTRACT

Wi-Fi access point performance management may include receiving a session analytic record related to a plurality of wireless access points, and analyzing the session analytic record related to the plurality of wireless access points to determine a root cause of at least one malfunctioning node related to at least one of the plurality of wireless access points, and predict failure of the at least one of the plurality of wireless access points. Further, a graphical user interface display or a report may be generated. The graphical user interface display or the report may be related to the determination of the root cause of the at least one malfunctioning node related to the at least one of the plurality of wireless access points, and prediction of the failure of the at least one of the plurality of wireless access points.

19 Claims, 21 Drawing Sheets

(51) Int. Cl.
  *H04W 4/80*   (2018.01)
  *H04W 84/12*  (2009.01)
  *H04W 88/08*  (2009.01)

(58) Field of Classification Search
  USPC .......................................................... 709/223
  See application file for complete search history.

(56) References Cited

U.S. PATENT DOCUMENTS

| | | | | |
|---|---|---|---|---|
| 2006/0233114 | A1* | 10/2006 | Alam | H04L 41/069 |
| | | | | 370/252 |
| 2006/0277299 | A1 | 12/2006 | Baekelmans et al. | |
| 2008/0049630 | A1* | 2/2008 | Kozisek | H04L 41/0823 |
| | | | | 370/250 |
| 2010/0130189 | A1* | 5/2010 | Morrison | H04W 48/20 |
| | | | | 455/422.1 |
| 2011/0057836 | A1* | 3/2011 | Ische | G01S 5/0009 |
| | | | | 342/357.43 |
| 2014/0036691 | A1 | 2/2014 | Madan et al. | |
| 2015/0135012 | A1 | 5/2015 | Bhalla et al. | |

OTHER PUBLICATIONS

Clifton D. Sutton: "Classification and Regression Trees, Bagging, and Boosting", In: "Time Series Analysis: Methods and Applications", Jan. 1, 2005, Elsevier, vol. 24, pp. 303-329.

* cited by examiner

| S.No. | Variable Name | Description |
|---|---|---|
| 1 | Latency_Flag | Dependent variable if latency <=200 then 0 else 1 |
| 2 | Primary Event | Number of events on wireless LAN gateway as Primary session |
| 3 | Secondary Event | Number of events on wireless LAN gateway as Secondary session |
| 4 | Primary Eq Secondary | If type of primary and secondary wireless LAN gateway is same |
| 5 | Type of Operating system | Access point Operating System |
| 6 | AP_ACCOUNT_STATUS | Access point account status |
| 7 | CM_LAST_POLL | Cable modem last polled time |
| 8 | CM_MODEL | Cable modem model |
| 9 | Combined_rating | Combined rating of the wireless LAN gateway |
| 10 | State | State, where wireless LAN gateway is physically located |
| 11 | FIRMWARE | Type of FIRMWARE installed |
| 12 | Primary_rating | Primary Rating of wireless LAN gateway |
| 13 | SSID_ENABLED | AP with SSID enabled |
| 14 | WLGW_TYPE | Type/Make of wireless LAN gateway |

FIG. 6

Summary of the Decision Tree model for Classification (built using 'rpart') :

n= 5086 node), split, n, loss, yval, (yprob)
 * denotes terminal node

700 →
1) root 5086 1292 0 (0.7745969328 0.2254030672)
2) Pri_events< 22 4463 674 0 (0.8489980506 0.1510019494)
4) PriEqSec>=0.5 4348 559 0 (0.8714355143 0.1285644857)
8) Sec_events< 13 3928 460 0 (0.8828920577 0.1171107943) *
9) Sec_events>=13 420 99 0 (0.7642857141 0.2357142286)
18) FIRMWARE=B,C,D,F 413 92 0 (0.7777239709 0.2222760291) *
19) FIRMWARE=A 7 0 1 (0.0000000000 1.0000000000) *
5) PriEqSec< 0.5 115 0 1 (0.0000000000 1.0000000000) *
3) Pri_events>=22 623 5 1 (0.008025682 0.991974318) *

Classification tree:
rpart (formula = latencyflag ~ ., date = crs$train,
c(crs$input, crs$traget)], method = "class", parms = list (split = "information"),
control = rpart.control (cp = 0.001, usesurrogate = 0, maxsurrogate = 0) )

702 →
Variables actually used in tree construction:
[1] FIRMWARE Pri_events PriEqsec Sec_events Root node error: 1292/5086 = 0.25403

FIG. 7

Coefficients:

|  | Estimate | Std. Error | z value | PR (>\|z\|) |  |
|---|---|---|---|---|---|
| (Intercept) | -2.197e+00 | 1.926e+00 | -1.141 | 0.2541 |  |
| Day_0_RX | 8.789e-10 | 3.184e-09 | 0.276 | 0.7825 |  |
| Day_0_TX | 6.484e-09 | 5.283e-08 | 0.123 | 0.9023 |  |
| Day_0_BANDWIDTH | -3.897e-08 | 1.072e-07 | -0.363 | 0.7163 |  |
| Day_0_LATENCY | 9.523e-04 | 2.776e-03 | 0.343 | 0.7316 |  |
| Day_0_SIGNAL | 1.558e-02 | 2.296e-02 | 0.678 | 0.4976 |  |
| Day_1_RX | -4.198e-09 | 5.757e-09 | -0.854 | 0.3929 |  |
| Day_1_TX | 9.650e-08 | 8.136e-08 | 1.186 | 0.2356 |  |
| Day_1_BANDWIDTH | -6.499e-08 | 1.063e-07 | -0.611 | 0.5411 |  |
| Day_1_LATENCY | -1.747e-03 | 3.268e-03 | -0.535 | 0.5929 |  |
| Day_1_SIGNAL | -3.710e-02 | 2.122e-02 | -1.749 | 0.0804 |  |

---

Signif. codes:  0 '*' 0.001 '' 0.01 '*' 0.05 '.' 0.1 ' ' 1

(Dispersion parameter for binomial family taken to be 1)

Null deviance: 279.32  on 244  degrees of freedom
Residual deviance: 272.46  on 234  degrees of freedom
AIC: 294.46

Number of fisher scoring iterations: 4

Log likelihood: -136.230  (11 df)
Null/Residual deviance differences: 6.863  (10 df)
Chi-square p-value : 0.09341126
Pseudo R-Square (optimistic) : 0.16382963

Error matrix for the Logistic model

| Training | | Predicted | | | Testing | | Predicted | | |
|---|---|---|---|---|---|---|---|---|---|
| | | Good | Bad | Error | | | Good | Bad | Error |
| Actual | Good | 0.74 | 0 | 0.01 | Actual | Good | 0.74 | 0 | 0.01 |
| | Bad | 0.25 | 0.01 | 0.97 | | Bad | 0.26 | 0 | 1 |

Overall error: 0.2530612, Averaged class error: 0.2926997

FIG. 10

Coefficients:

|  | Estimate | Std. Error | z value | PR (>|z|) |
|---|---|---|---|---|
| (Intercept) | -0.188946738176 | 2.259058271776 | -0.084 | 0.9333 |
| Day_0_RX | -0.000000004458 | 0.000000005690 | -0.783 | 0.4334 |
| Day_0_TX | -0.000000004795 | 0.000000065568 | -0.073 | 0.9417 |
| Day_0_BANDWIDTH | -0.000000127371 | 0.000000136853 | -0.931 | 0.3520 |
| Day_0_LATENCY | -0.002912105197 | 0.003211015008 | 0.907 | 0.3645 |
| Day_0_SIGNAL | -0.052475404115 | 0.027909894295 | 1.880 | 0.0601 |
| Day_1_RX | -0.000000005073 | 0.000000006934 | -0.732 | 0.4644 |
| Day_1_TX | -0.000000092774 | 0.000000086030 | 1.078 | 0.2809 |
| Day_1_BANDWIDTH | -0.000000044898 | 0.000000133982 | -0.335 | 0.7375 |
| Day_1_LATENCY | -0.004923882936 | 0.004053694936 | -1.215 | 0.2245 |
| Day_1_SIGNAL | -0.039381566398 | 0.025693824083 | -1.533 | 0.4334 |
| AP_Tunnel_Flag | 4.024029690705 | 0.794300824083 | 5.066 | 0.000000406 *** |
| AP_COS_Flag | 3.215760930589 | 0.712938077914 | 4.511 | 0.000006465 *** |

1102

Signif. codes:  0 '*' 0.001 '' 0.01 '*' 0.05 '.' 0.1 ' ' 1

(Dispersion parameter for binomial family taken to be 1)

Null deviance: 279.32  on 244  degrees of freedom
Residual deviance: 202.91  on 232  degrees of freedom
AIC: 228.19

Number of fisher scoring iterations: 5

Log likelihood: -101.456  (13 df)
Null/Residual deviance differences: 76.410  (12 df)
Chi-square p-value : 0.00000000
Pseudo R-Square (optimistic) : 0.60227920

Error matrix for the Logistic model

Training

| Actual | Predicted |  |  |
|---|---|---|---|
|  | Good | Bad | Error |
| Good | 0.72 | 0.02 | 0.03 |
| Bad | 0.13 | 0.13 | 0.51 |

Testing

| Actual | Predicted |  |  |
|---|---|---|---|
|  | Good | Bad | Error |
| Good | 0.56 | 0.02 | 0.03 |
| Bad | 0.17 | 25 | 0.41 |

Overall error: 0.1923077, Averaged class error: 0.1541353

FIG. 12

```
glm(formula = BadDep ~ ., family = binomial (link = "logit"),
    data = crs$dataset [crs$train, c(crs$input, crs$target)])

Deviance Residuals:
    Min       1Q    Median       3Q      Max
-1.94991  -0.40882  -0.23810  0.04735  2.75444

Coefficients:
                  Estimate Std. Error z value PR (>|z|)
(Intercept)       -2.92026   0.37324  -7.824  5.11e-15 ***
change_Rx         -0.16225   0.07562  -2.146  0.03190 *
change_BANDWIDTH  -0.97049   0.34719  -2.795  0.00519 **
change_LATENCY     1.46343   0.36658   3.922  6.55e-05 ***
AP_Tunnel_Flag     4.53897   0.71645   6.335  2.37e-10 ***
AP_COS_Flag        4.18437   0.67779   6.174  6.68e-10 ***
---
Signif. codes:  0 '*' 0.001 '' 0.01 '*' 0.05 '.' 0.1 ' ' 1

(Dispersion parameter for binomial family taken to be 1)

Null deviance: 287.47  on 244  degrees of freedom
Residual deviance: 126.53  on 239  degrees of freedom
AIC: 138.53

Number of fisher scoring iterations: 7

Log likelihood: -63.266  (6 df)
Null/Residual deviance differences: 160.941  (5 df)
Chi-square p-value : 0.00000000
Pseudo R-Square (optimistic) : 0.79242037
```

FIG. 13

Error matrix for the Logistic model

| Training | | Predicted | | | Testing | | Predicted | | |
|---|---|---|---|---|---|---|---|---|---|
| | | Good | Bad | Error | | | Good | Bad | Error |
| Actual | Good | 0.69 | 0.03 | 0.04 | Actual | Good | 0.7 | 0.02 | 0.03 |
| | Bad | 0.06 | 0.22 | 0.21 | | Bad | 0.9 | 0.19 | 0.33 |

Overall error: 0.08979592, Averaged class error: 0.1036172

```
┌─────────────────────────────────────────────────────────┐
│   RECEIVE A SESSION ANALYTIC RECORD RELATED             │
│   TO A PLURALITY OF WIRELESS ACCESS POINTS              │
│                      1902                                │
└─────────────────────────────────────────────────────────┘
                            │
                            ▼
┌─────────────────────────────────────────────────────────┐
│   ANALYZE THE SESSION ANALYTIC RECORD RELATED TO THE    │
│   PLURALITY OF WIRELESS ACCESS POINTS TO DETERMINE A ROOT│
│   CAUSE OF AT LEAST ONE MALFUNCTIONING NODE RELATED TO AT│
│   LEAST ONE OF THE PLURALITY OF WIRELESS ACCESS POINTS  │
│                      1904                                │
└─────────────────────────────────────────────────────────┘
                            │
                            ▼
┌─────────────────────────────────────────────────────────┐
│  GENERATE AT LEAST ONE GRAPHICAL USER INTERFACE DISPLAY │
│  OR AT LEAST ONE REPORT THAT INCLUDES A DECISION TREE THAT│
│  IDENTIFIES THE ROOT CAUSE OF THE AT LEAST ONE          │
│  MALFUNCTIONING NODE RELATED TO THE AT LEAST ONE OF THE │
│         PLURALITY OF WIRELESS ACCESS POINTS             │
│                      1906                                │
└─────────────────────────────────────────────────────────┘
```

WI-FI ACCESS POINT PERFORMANCE MANAGEMENT

PRIORITY

The present application claims priority to Indian patent application number 3103/CHE/2015, having a filing date of Jun. 22, 2015, the disclosure of which is hereby incorporated by reference in its entirety.

BACKGROUND

In computer networking, a wireless access point is a device that allows wireless devices to connect to a wired network to form a wireless local area network (WLAN). An access point may connect directly to a wired Ethernet connection and provide wireless connections using radio frequency (RF) links (e.g., Wi-Fi, Bluetooth, or other types of standards) for other devices to utilize the wired connection. An access point may support the connection of multiple wireless devices to one wired connection.

Access points may include wide applications in corporate, public, educational, and home WLANs. A WLAN may include several access points attached to a wired network to provide devices with wireless access to the Internet or another wide area network. A hotspot is a public application of access points where wireless clients may connect to the Internet without regard for the particular networks to which they have attached for the moment. Further, access points may be used in home wireless networks to wirelessly connect all the computers in a home or office.

BRIEF DESCRIPTION OF DRAWINGS

Features of the present disclosure are illustrated by way of examples shown in the following figures. In the following figures, like numerals indicate like elements, in which:

FIG. 6 illustrates a table of independent variables for predicting connection latency for root cause analysis of malfunctioning nodes, according to an example of the present disclosure;

FIG. 7 illustrates a decision tree model for root cause analysis of malfunctioning nodes, according to an example of the present disclosure;

FIG. 9 illustrates an initial run output for determining an access point failure prediction model for access point failure prediction, according to an example of the present disclosure;

FIG. 10 illustrates an error matrix for the initial run output for the access point failure prediction model of FIG. 9, according to an example of the present disclosure;

FIG. 11 illustrates a further run output for determining the access point failure prediction model, according to an example of the present disclosure;

FIG. 12 illustrates an error matrix for the further run output for the access point failure prediction model of FIG. 11, according to an example of the present disclosure;

FIG. 13 illustrates a yet further run output for determining the access point failure prediction model, according to an example of the present disclosure;

FIG. 14 illustrates an error matrix for the yet further run output for the access point failure prediction model of FIG. 13, according to an example of the present disclosure;

FIG. 19 illustrates further details of a flow diagram of the method for Wi-Fi access point performance management, according to an example of the present disclosure.

DETAILED DESCRIPTION

Figure 1A:
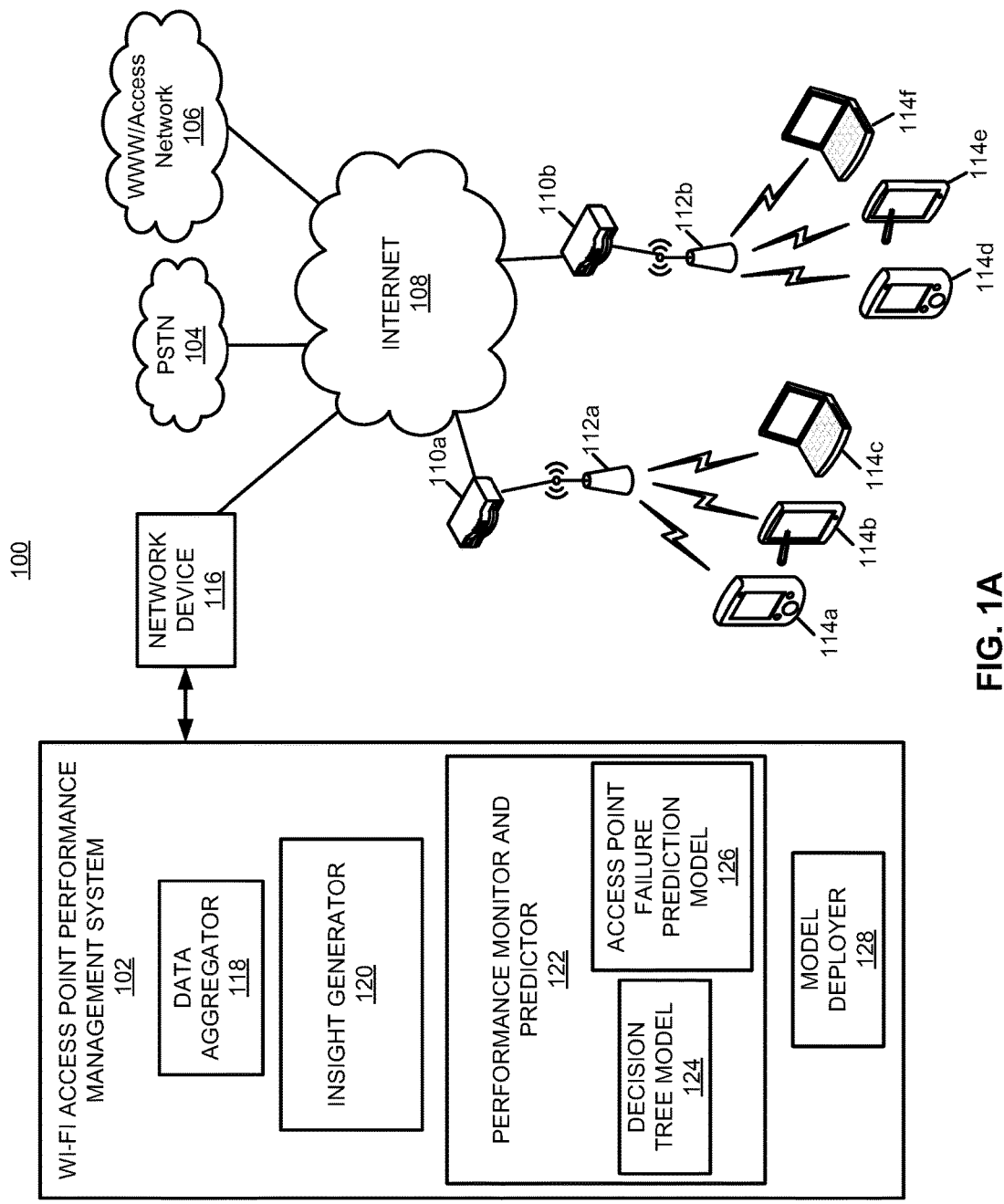
FIG. 1A illustrates an environment including a Wi-Fi access point performance management system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A service operations center within a telecom operator may be entrusted with maintaining an optimum level of service quality across a network. The service operations center may continuously monitor and act upon service degradations, disruptions, and outages across different areas and regions. A network operations center may monitor faults and events, and track the performance of a network. Based, for example, on a combination of network, geographical, and hardware variables associated with networks, performance management of such networks can be challenging.

To order address performance management challenges with respect to networks, a Wi-Fi access point performance management system and a method for Wi-Fi access point performance management are disclosed herein. The system and method disclosed herein may use advanced visualization techniques and statistical models to both indicate network downtime, as well as highlight a possible root cause. The root cause may be described as the most probable cause for an observed network conditions. In the system and method disclosed herein, a performance monitor and predictor as described herein may isolate the root cause from other potential causes by analyzing the effect of each of these causes, and highlighting the cause that is most correlated to the observed anomaly. The system and method disclosed herein may also provide a forecast of access point downtime, for example, due to hardware failure based on past performance.

The system and method disclosed herein may provide for the performance management of networks, for example, by providing a user, such as a network operations center user, with information related to root cause analysis of malfunctioning nodes, and/or failure prediction of access points. A node may be described as part of a wired network, where the node may act as a connection point to other access points and networks. An access point may be described as the connection end point through which users are able to connect via Wi-Fi. The system and method disclosed herein may also provide a user, such as a service operations center user and/or a network operations center user, with insights, for example, in the form of graphical displays and/or decision trees. According to an example, the graphical displays may be generated by the system and method disclosed herein for information related to root cause analysis of malfunctioning nodes, and/or failure prediction of access points. According to an example, the decision trees may be generated by the system and method disclosed herein for the information related to root cause analysis of malfunctioning nodes.

With respect to regions (e.g., of a country, territory, etc.), the graphical displays may include, for example, network performance vis-à-vis time to login, latency, throughput, and/or signal strength (RSSI). With respect to a backhaul side of a network, the graphical displays may include, for example, network uptime and service uptime. Other types of graphical displays may include, for example, router modems and/or access points plotted vis-à-vis their longitude and latitude information, throughput performance, how different access points may perform in the future (e.g., the next 24 hours), etc.

With respect to decision trees, a user, such as a network operations center user, may be provided with a display and/or report related to a real-time updating decision tree to facilitate diagnosis of why certain nodes marked, for example, in a predetermined color, are not performing as well as nodes marked in a different predetermined color. Further, with respect to decision trees, a user, such as a network operations center user, may be provided with inputs on how a network is responding to corrective actions that are being taken.

For the apparatus and method disclosed herein, variables in the statistical modeling of the disclosed examples may be divided into a dependent variable and independent variables. The dependent variable may represent a tested output or effect on the access point performance and the quality of service for transmission over the WLAN. For example, a dependent variable may include, but is not limited to, latency, login time, signal strength, or throughput at an access point. The independent variables may represent the tested inputs or causes for the access point performance and the quality of service for transmission over the WLAN. For example, the independent variables may include primary event, secondary event, primary Eq secondary, type of operating system, etc., as disclosed herein. The test input may be described as the input set of variables (i.e., independent variables) in the statistical analysis. The input variables may include most likely causes for an issue or lag variables that may be used to predict an event in future. The test output may include the set of dependent variables for a statistical modeling analysis. The test output may include the events that are to be predicted (e.g., high latency, low throughput, etc.).

The system and method disclosed herein may provide a self-contained solution for Wi-Fi health monitoring and downtime diagnosis. The system and method disclosed herein may provide region and division level customer experience monitoring, rank ordering and identification of low performing access points, efficient validation and optimization of access point and/or gateway configurations, and device failure prediction where devices and nodes may be replaced before total failure. The system and method disclosed herein may thus provide for enhanced customer experience through load forecasting and bandwidth optimization. Further, the system and method disclosed herein may provide proactive network operations and control, and integration into a network operations center and/or a service operations center with reduced effort for management of Wi-Fi operations.

According to an example, the system and method disclosed herein may be linked, for example, to a client ticketing system to further enhance the capabilities of the client ticketing system. For example, the system and method disclosed herein may be used to create alarms for network operations center and/or a service operations center users based on rules from insights related to the root cause analysis of malfunctioning nodes, and/or failure prediction of access points. According to an example, the system and method disclosed herein may be used to create workflows and assign tasks to rectify issues for the alarms generated and issues identified. According to an example, the system and method disclosed herein may be used to track progress on tickets generated and close tickets once a task has been completed. According to an example, the system and method disclosed herein may provide for an integrated workflow system that will generate insights, create alarms, assign tickets, track progress, and close tickets.

According to an example, the system and method disclosed herein may provide score card functionality, where customer experience may be rated, and trends of initiative (firmware upgrades, etc.) may be monitored. According to an example, the system and method disclosed herein may provide a real time geospatial network health view, including primary nodes, secondary nodes, and access points. According to an example, the system and method disclosed herein may provide for preventive and/or corrective actions through predictive and root cause analytics for proactive network operations and control.

According to an example, the system and method disclosed herein may provide a role based advanced analytics solution for a service operations center user and network operations center user, and solve the limitation of visually inspecting problematic Wi-Fi access points, and evaluating the real-time performance and historical trends on access point performance metrics related to Wi-Fi end-user device customer experience, access point environment health, and access point infrastructure and core infrastructure health for which data may be machine generated. Once a service operations center user identifies an issue, the issue may be highlighted with the network operations center user. The network operations center user may use advanced analytics capability to identify a root cause of the network issue using automated decision tree functionality, and further use prediction scores based on regression techniques to effectively predict any potential network issue in the near future, and take preventive and corrective actions. The system and method disclosed herein may facilitate access point performance management by optically drilling down to the problem area or access points, and analyzing historical performance trends across each of the dominating factors for performance. The system and method disclosed herein may also provide predictive analytics capability over network data to statistically predict access point suboptimal performance for a future day, and determine root cause analytics for access point suboptimal performance though automated decision tree techniques that may be used to identify the reason for sub-optimal performance. These aspects may be used to optimize network performance and to improve customer experience.

The Wi-Fi access point performance management system and the method for Wi-Fi access point performance management disclosed herein provide a technical solution to technical problems related, for example, to Wi-Fi access point performance management. In many instances, efficiency of Wi-Fi access point performance management can be limited, for example, due to the vast amounts of data sources and dynamic information associated with networks. The system and method disclosed herein provide the technical solution of a performance monitor and predictor that is executed by at least one hardware processor to receive a session analytic record related to a plurality of wireless access points, and analyze the session analytic record related to the plurality of wireless access points to determine a root cause of at least one malfunctioning node related to at least one of the plurality of wireless access points, and predict failure of the at least one of the plurality of wireless access points. The system and method disclosed herein may further include an insight generator that is executed by the at least one hardware processor to generate at least one graphical user interface display or at least one report related to the determination of the root cause of the at least one malfunctioning node related to the at least one of the plurality of wireless access points, and prediction of the failure of the at least one of the plurality of wireless access points. A model deployer that is executed by the at least one hardware processor may track, based on a second decision tree, a result of a modification related to an attribute of the at least one of the plurality of wireless access points, by comparing the second decision tree to a first decision tree that represents the at least one malfunctioning node related to the at least one of the plurality of wireless access points prior to the modification related to the attribute of the at least one of the plurality of wireless access points. For the system and method disclosed herein, a decision tree model may be used to identify the drivers of any event. The decision tree based structure of the analysis may facilitate comprehension, and provide insights on the likely root causes of an event. In comparison, other techniques do not provide clear rules for mal-performance that may be used to take actions. Further, machine learning techniques may be used for the system and method disclosed herein to predict the occurrence of an event in the future based on past performance data. For example, a logistic regression technique may be used to predict failure since the dependent variable under consideration includes a binary context (e.g., access point fail, or access point will not fail). A resulting access point failure prediction model may provide a probability of an access point failure in the future.

FIG. 1A illustrates an environment 100 including a Wi-Fi access point performance management system 102, according to an example of the present disclosure. The system 102 may include connectivity to different network types, including a public switched telephone network (PSTN) 104, the World Wide Web (WWW) or access network 106, the Internet 108, routers 110a-b, access points 112a-b, and wireless devices 114a-f.

The wireless devices 114a-f (i.e., access point clients) may include personal digital assistants (PDAs), mobile phones, tablets, laptops, and other wireless mobile devices. By way of example, and not by way of limitation, wireless devices 114a-c may connect to access point 112a and wireless devices 114d-f may connect to access point 112b using various radio frequency (RF) protocols, such as a global system for mobile general packet radio service (GSM GPRS), an evolution data only (EV-DO), Bluetooth, Wi-Fi, Long-Term Evolution (LTE), 3G, 4G, etc., to access a wireless land area network (WLAN). That is, access points 112a-b may provide wireless devices 114a-f with wireless access to a wired Ethernet network.

According to an example, access point 112a may connect to router 110a and access point 112b may connect to router 110b to provide wireless devices 114a-f with access to the Internet 108. Routers 110a-b may provide additional built-in security, such as a firewall. Access points 112a-b may, for example, be incorporated in routers 110a-b as a single device or provided as a separate device to provide the wireless devices 114a-f with access to the Internet 108. Thus, access points 112a-b may provide a wireless to wireline connection for access to the Internet 108 and may be a wireless "hot-spot" such as a Bluetooth or Wi-Fi access point in a public location according to an example. According to an example, each of the access points may include a controller to receive instructions and locally set controllable parameters according to the instructions. The Internet 108 may have various connections to the PSTN 104, the WWW 106, and a WLAN intelligent server, for instance, through gateways using the Transmission Control Protocol/Internet Protocol (TCP/IP).

The system 102 may be a desktop computer, a laptop computer, a smartphone, a computing tablet, or any type of computing device. The system 102 may provide for Wi-Fi access point performance management, for example, with respect to the network related to the routers 110a-b, access points 112a-b, and wireless devices 114a-f. The system 102 may provide the Wi-Fi access point performance management, for example, through a network device 116, which may include, for example, a router, a switch, a hub, and the like.

The system 102 may include a data aggregator 118 that is executed by a hardware processor (e.g., the hardware processor 2002) to aggregate, summarize, and perform missing value treatment, as well as statistical and functional enrichment on vast amounts of data (e.g., real-time and/or stored data) from data sources that may include device generated session data, access point location and performance data, wireless LAN gateway data, and access point, node, and core health data.

The device generated session data may represent Wi-Fi session records obtained from the wireless devices 114a-f connected to the network. The Wi-Fi session data may include client side measured session level information such as signal strength, session start time, session duration, data transferred, connection bandwidth, etc., and may be received from a source such as client software (i.e., machine readable instructions) that is executed on the wireless devices 114a-f. The Wi-Fi session data may be joined with the access point location and performance data, wireless LAN gateway data, and access point, node, and core health data, for example, by using a structured query language (SQL) on a unique identifier (e.g., basic service set identification (BSSID) or service set identification (SSID)).

The access point location data may be described as data related to a location of an access point (latitude and longitude), aerial type (indoor/outdoor), etc., and may be received from a source such as a master file.

The access point profile data may be described as access point hardware and software information, date of installation, service date of an access point, connected node information, etc., and may be received from a source such as a master service log.

The wireless LAN gateway data may be described as gateway logs that include login time, tunnels active, number of subscribers online, etc., and may be received from a source such as an individual gateway log.

The access point and node data may be described as periodic reports generated by pinging access points and nodes, health check logs, etc., and may be received from sources such as network probes.

The statistical enrichment may be described as enrichment of raw data elements to generate more meaningful data elements (e.g., number of client connections to an access point in a four hour window, total data transferred from an access point during a day, rate of change of latency, throughput, download data, etc., over the past two to three days, average latency, throughput, download data, etc., over the past two to three days, missing value treatment on modeling data—median value for a sample, outlier treatment—capping values above 99% percentile for analysis, etc.) and may be received from a statistical subject matter expert.

The functional enrichment may be described as enrichment of access point connections data to include additional information that may facilitate performance management such as "optimum latency operating band", "optimum throughput range", "client software", "obstructions such as foliage, buildings at site" etc., and may be received from a functional subject matter expert.

The data aggregator 118 may generate a session analytic record based on the aggregation, summarization, and missing value treatment performance. The session analytic record may include enriched session level data with access point, wireless LAN gateway, node, and core health information. With respect to the enriched session level data, enrichment of the data may allow the variables to be transformed to be more precisely aligned with each other. For example, the enrichment process may include removing records with incomplete data (e.g., missing latency, throughput, signal strength values, etc.), scaling throughput values (measured, for example, in bps) to mbps to be comparable to signal strength and latency metrics, and adding variables from other sources (e.g., core health data, wireless LAN gateway data, etc.). Enriching the session data may provide a complete view of the network conditions to be captured and processed, for example, for implementing the predictive capability of the techniques described herein, and for accounting for all probable aspects of network issues. An example of a session analytic record may include, in addition to metrics such as throughput, latency, and signal strength, other session level factors such as time of day, location of an access point, session encryption, user device configuration, tunnel server configuration, Domain Name System (DNS) server, etc., that may also be captured and analyzed. An access point ID or wireless LAN gateway host name may be added to the session analytic record for analysis, for example, to analyze the impact of wireless LAN gateway performance on the network. This is because certain configurations of the wireless LAN gateway may negatively impact performance. An access point may be located at the user end of the network connection. Any data sent by the user to the external network (e.g., Internet) may travel from the access point to the node, which in turn is connected to the network core via the "backhaul". Core health information may be related to the performance metrics of this network core. A wireless access point may be described as the connection end point, connected to the backhaul through a series of nodes and gateways. The performance of an access point may be dependent on the optimal operation of the complete network infrastructure.

The data aggregator 118 may also generate device session data, which may be mapped to the data sources through a complex basic service set identification (BSSID) mapping technique. The session analytical record may include the parameters and settings of the access point, node, WLAN gateway, etc., at the time that the session occurs. If a performance drop is noticed at a later stage, the session analytical records before and after the performance degradation may be compared to identify what parameters have changed (i.e., perhaps the software version on the WLAN gateway was updated, etc.) to facilitate in identification of root causes. Based on functional expertise, login time, signal strength, throughput, and latency may be identified as parameters that are important to visualize network insights.

An insight generator 120 that is executed by a hardware processor may provide for insight generation and issue identification, for example, for a service operations center, by monitoring of real time performance of access points and/or regions based on device experience metrics, environment, and backhaul, identification of trends of sub-optimal performance, and performance of first level root cause analytics. Further, the insight generator 120 may provide for insight generation and issue identification, for example, for the service operations center, by providing real-time insights and performance trends for Wi-Fi end-user device customer experience, access point environment health, and access point infrastructure and core infrastructure health.

As disclosed herein, the insight generator 120 may provide role based visualization configuration for a network operations center to facilitate focusing on network uptime, and for a service operations center to facilitate focusing on network user experience. The insight generator 120 may provide access point level visualization configuration of user experience. The insight generator 120 may generate trend views (e.g., a plurality of decision trees for a predetermined time duration as disclosed herein) to facilitate root cause analysis of malfunctioning nodes. Further, the insight generator 120 may generate regional aggregation views to facilitate identification of low performing regions and root cause analysis of malfunctioning nodes, and embedded decision trees to identify drivers of sub-optimal performance. The insight generator 120 may also provide for insight generation and issue identification, for example, for the network operations center, by providing real time access point infrastructure health and insights for preventive and corrective maintenance using predictive analytics regression models to predict suboptimal performance of access points, and provide root cause analytics through automated decision trees on network related issues.

A performance monitor and predictor 122 that is executed by a hardware processor may implement, for example, for a network operations center, machine learning to predict access point sub-optimal performance (e.g., based on high latency) based, for example, on data from a predetermined past time duration (e.g., past two days), and root cause analytics on historical events to determine drivers of access point sub-optimal performance.

As disclosed herein, the performance monitor and predictor 122 may generate a decision tree model 124 to generate statistical decision trees for a predetermined time interval (e.g., every six hours) for root cause analytics to identify issues using data analyzed by the data aggregator 118. The root cause analytics may be performed, for example, by using recursive partitioning. The performance monitor and predictor 122 may also implement logistic regression for an access point failure prediction model 126 for access point failure prediction, for example, one day in advance using end to end data dimensions (e.g., device, environment, access point, core data, etc.).

An output of performance monitor and predictor 122 may provide for the network operations center user to identify possible problems/issues in a deployed network. For example, from the session analytical record as described herein, the decision tree model 124 may identify a possible root cause by partitioning the nodes across different session variables. In the event a possible root cause is identified, the network operations center user may readily identify the root cause by analyzing the decision tree. Similarly, the network operations center user may visualize the predicted performance of wireless access points, and take note if this predicted performance falls below acceptable norms. An example of an output of the performance monitor and predictor 122 may include possible root causes for poor node performance (e.g., high long login events at wireless LAN gateway, firmware of access points, type of wireless LAN gateway, etc., as described herein with reference to FIGS. 4, and 6-8) in a decision tree format. Another example of an output of the performance monitor and predictor 122 may include probability of poor performance of access points in the next eight to twenty-four hours, as described herein with reference to FIGS. 5 and 9-14.

A model deployer 128 that is executed by a hardware processor may provide for the deployment of the decision tree model 124 related to root cause analysis of malfunctioning nodes, and the access point failure prediction model 126 related to failure prediction of access points. For example, the model deployer 128 may provide for a service operations center user to identify abnormal trends in access point, region, and/or backhaul performance, and informing of such abnormal trends to a network operations center user. In this regard, a network operations center user may use real time monitoring, and machine learning and/or root cause analysis tools to rectify an issue related to the abnormal trends. Further, the model deployer 128 may provide for tracking of the results of the decision tree model 124 related to root cause analysis of malfunctioning nodes, and the access point failure prediction model 126 related to failure prediction of access points upon resolution of an issue related to the abnormal trends.

According to an example, the model deployer 128 may receive the outputs of the performance monitor and predictor 122, and automatically (i.e., without human intervention) rectify any problems identified by the outputs. For example, once the decision tree model 124 and the access point failure prediction model 126 are developed, the models may be deployed by the model deployer 128. For each day, the access point failure prediction model 126 may provide the probability of poor performance of access points for the next day by scoring the access point failure prediction model 126 on data ascertained for previous days (e.g., previous two days). With respect to the decision tree model 124, the decision tree may be refreshed on a graphical user interface display at an interval, for example, of six hours using session analytic record data, for example, for the past six hours. In this regard, the model deployer 128 may use a predetermined list of prioritized problems and/or machine learning based on previous problem scenarios to determine which root causes and potential problems have been identified by the decision tree model 124 and the access point failure prediction model 126, and implement corrective actions to rectify the problems. Examples of corrective actions may include firmware upgrade, re-routing of traffic to another node, re-setting of an access point and/or associated components, replacing an access point that is expected to fail, etc.

As described herein, the elements of the system 102 may be machine readable instructions stored on a non-transitory computer readable medium. In addition, or alternatively, the elements of the system 102 may be hardware or a combination of machine readable instructions and hardware. Further, it should be understood that the system 102 may include additional elements, and that one or more of the elements described herein may be removed, combined, and/or modified without departing from the scope of the system 102.

Figure 1B:
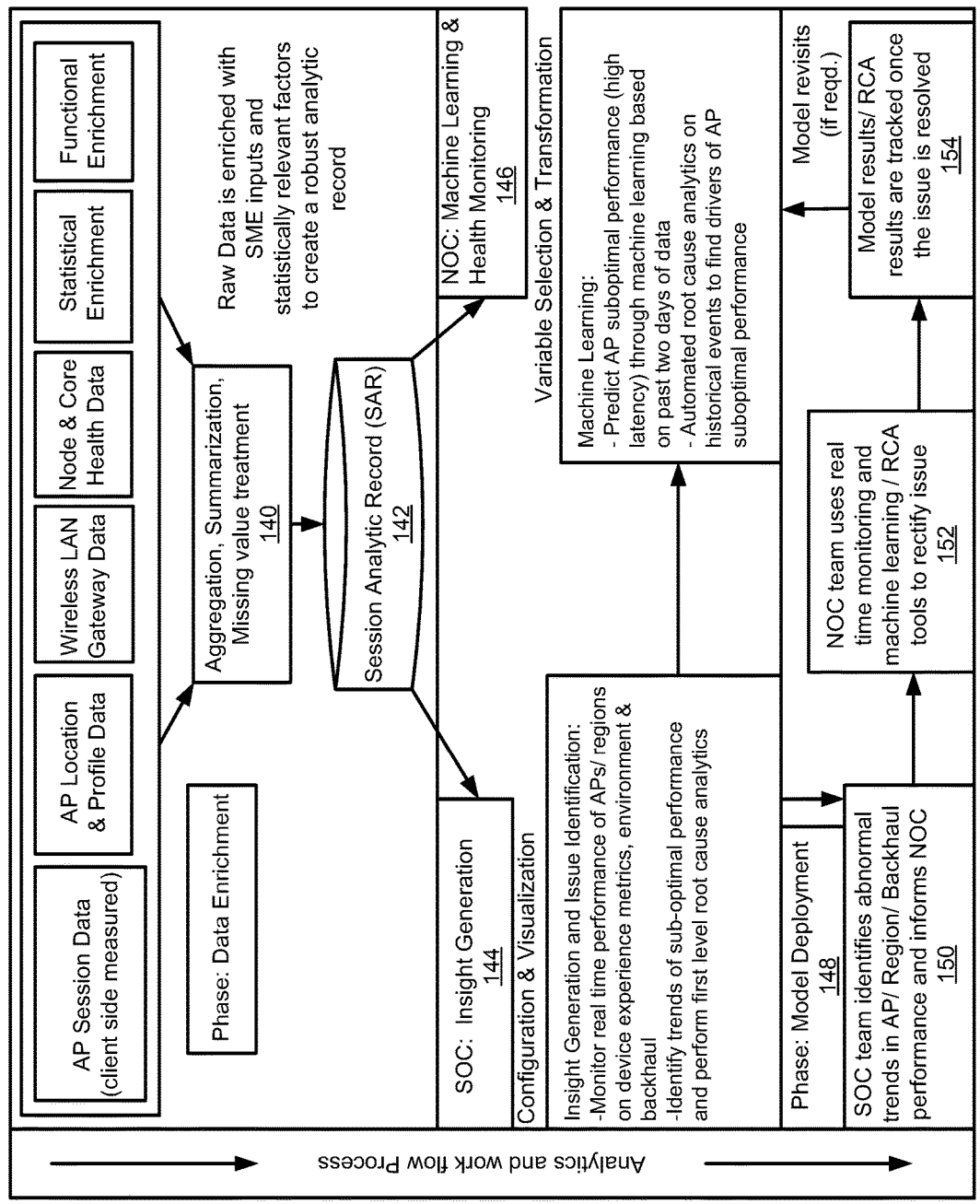
FIG. 1B illustrates an architectural flow diagram for the Wi-Fi access point performance management system of FIG. 1A, according to an example of the present disclosure.

FIG. 1B illustrates an architectural flow diagram for the system 102, according to an example of the present disclosure.

Referring to FIGS. 1A and 1B, at block 140, the data aggregator 118 may aggregate, summarize, and perform missing value treatment, as well as statistical and functional enrichment on data (e.g., real-time and/or stored data) from data sources that include, for example, device generated session data, access point location and performance data, wireless LAN gateway data, and access point, node, and core health data.

At block 142, the data aggregator 118 may generate a session analytic record based on the aggregation, summarization, and missing value treatment performance.

At block 144, the insight generator 120 may provide for insight generation and issue identification, for example, for a service operations center, by monitoring of real time performance of access points and/or regions based on device experience metrics, environment, and backhaul, identification of trends of sub-optimal performance, and performance of first level root cause analytics.

At block 146, the performance monitor and predictor 122 may implement, for example, for a network operations center, machine learning to predict access point sub-optimal performance (e.g., based on high latency) based, for example, data from a predetermined past time duration (e.g., past two days), and root cause analytics on historical events to determine drivers of access point sub-optimal performance.

At block 148, the model deployer 128 may provide for a service operations center user to identify abnormal trends in access point, region, and/or backhaul performance, and informing of such abnormal trends to a network operations center user (e.g., at block 150). In this regard, at block 152, a network operations center user may use real time monitoring, and machine learning and/or root cause analysis tools to rectify an issue related to abnormal trends. Further, at block 154, the model deployer 128 may provide for the tracking of results of the models related to root cause analysis of malfunctioning nodes, and failure prediction of access points upon resolution of an issue related to the abnormal trends.

Figure 2:
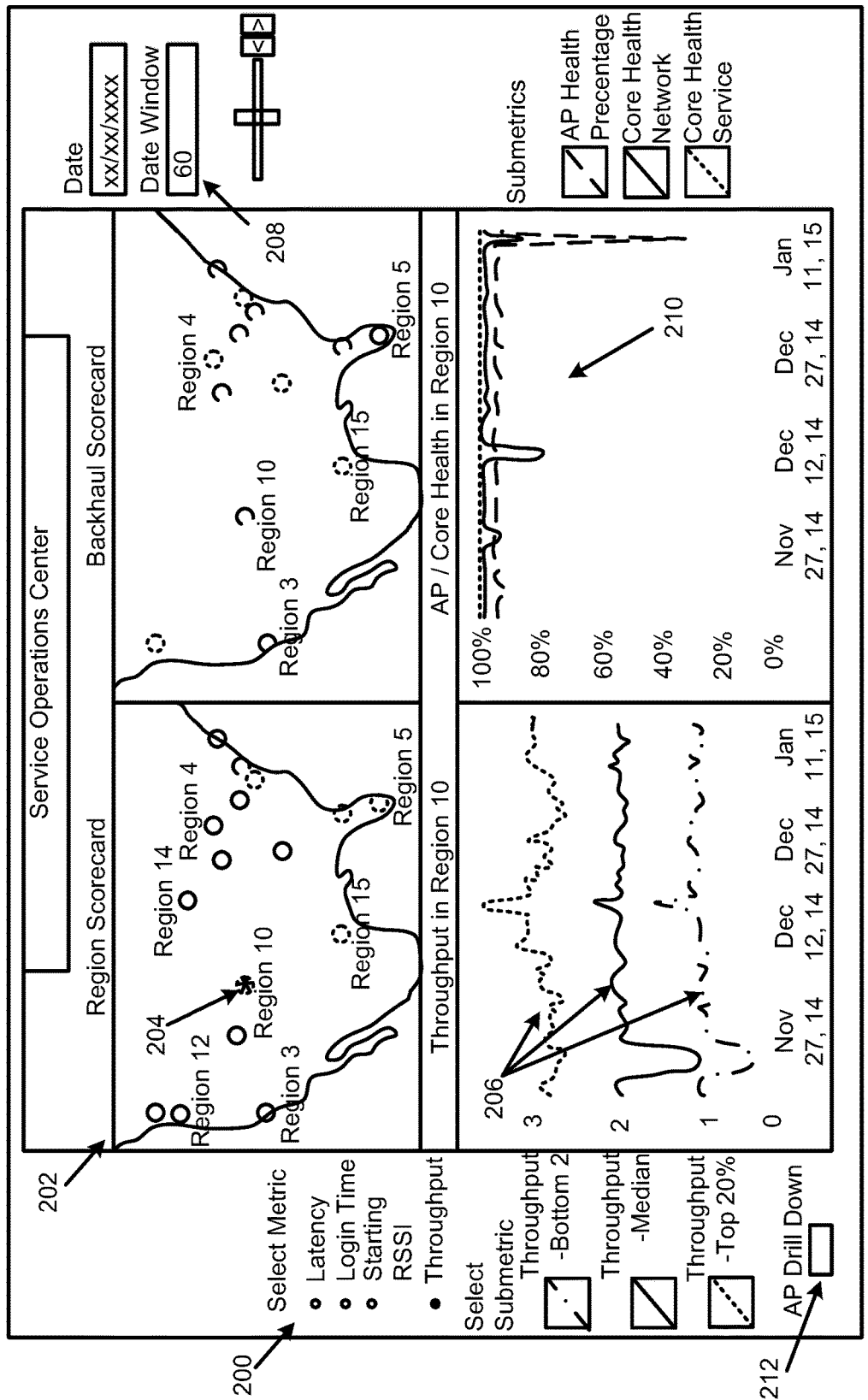
FIG. 2 illustrates a graphical user interface display for regional and backhaul network performance for a service operations center, according to an example of the present disclosure.

FIG. 2 illustrates a graphical user interface display for regional and backhaul network performance for a service operations center, according to an example of the present disclosure.

Referring to FIGS. 1A and 2, the "Region Scorecard" and the "Backhaul Scorecard" displays of FIG. 2 may represent examples of displays based on real-time aggregation of disparate data from the routers 110*a-b*, the access points 112*a-b*, and/or the wireless devices 114*a-f* for facilitating insight related to this data. As disclosed herein, based on functional expertise, at 200, latency, login time, signal strength (i.e., starting RSSI), and throughput may represent parameters that are important (i.e., highly related) for visualizing network insights. The metrics of latency, login time, signal strength, and throughput may be selected to generate a display similar to the "Throughput in Region 10" display of FIG. 2. At 202, the insight generator 120 may generate insights at different regional levels. For each region, the display may include network performance vis-à-vis latency, time to login, signal strength, and throughput. In order to differentiate the network performance, different colored markers (e.g., red, amber, green, etc.) at 204 may indicate the respective metric quality. For example, the different colored markers at 204 may be used to highlight regions with customer dissatisfaction (e.g., by using a red color). At 206, throughput levels, for example, at bottom 20%, median, and top 20% may be displayed for a time window selected at 208.

With respect to the backhaul side of a network, network uptime and service uptime may be displayed at 210 to facilitate tracking of whether an issue is due to service outage at the backhaul, or whether the issue has a different root cause altogether. In this regard, a historical trend of a metric (e.g., access point/core health for Region 10) may be displayed at 210.

The displays of FIG. 2 may be specific to the region selected and date and/or date window combination (e.g., at 208). According to an example, the displays of FIG. 2 may be defaulted at sixty days. The displays at 206 may also be changed based on selection of a metric at 200, region at 202, etc. The map views identified as "Region Scorecard" and "Backhaul Scorecard" may include daily performance. The views identified as "Throughput in Region 10" and "AP/Core Health in Region 10" may represent historical trend views.

With respect to the displays of FIG. 2, a user may drill down on the graphs to obtain more information and access different comparisons. For example, when investigating a throughput issue, a user may drill down and see the trended histogram of throughput for that impacted region over time. This would allow the user to identify when a problem started. A user may compare regions against each other (e.g., see which is performing best, is the impact limited to one region, etc.). A user may perform an access point type comparison (e.g., which access point is the best, is one access point type impacted, etc.). With respect to access point type, access points may be upgraded via firmware upgrades to address specific performance issues. At times, a firmware upgrade may result in other undocumented issues on performance. In this regard, tracking access point hardware and firmware may facilitate addressing of a potential cause of degraded network performance. A user may also perform an access point type and software comparison (e.g., is one access point software version better than another, and/or impacted by an issue). A user may further perform a WLAN gateway comparison (e.g., is one WLAN gateway performing better than another, etc.).

Graphical User Interface Display—Insight Generator 120

Figure 3:
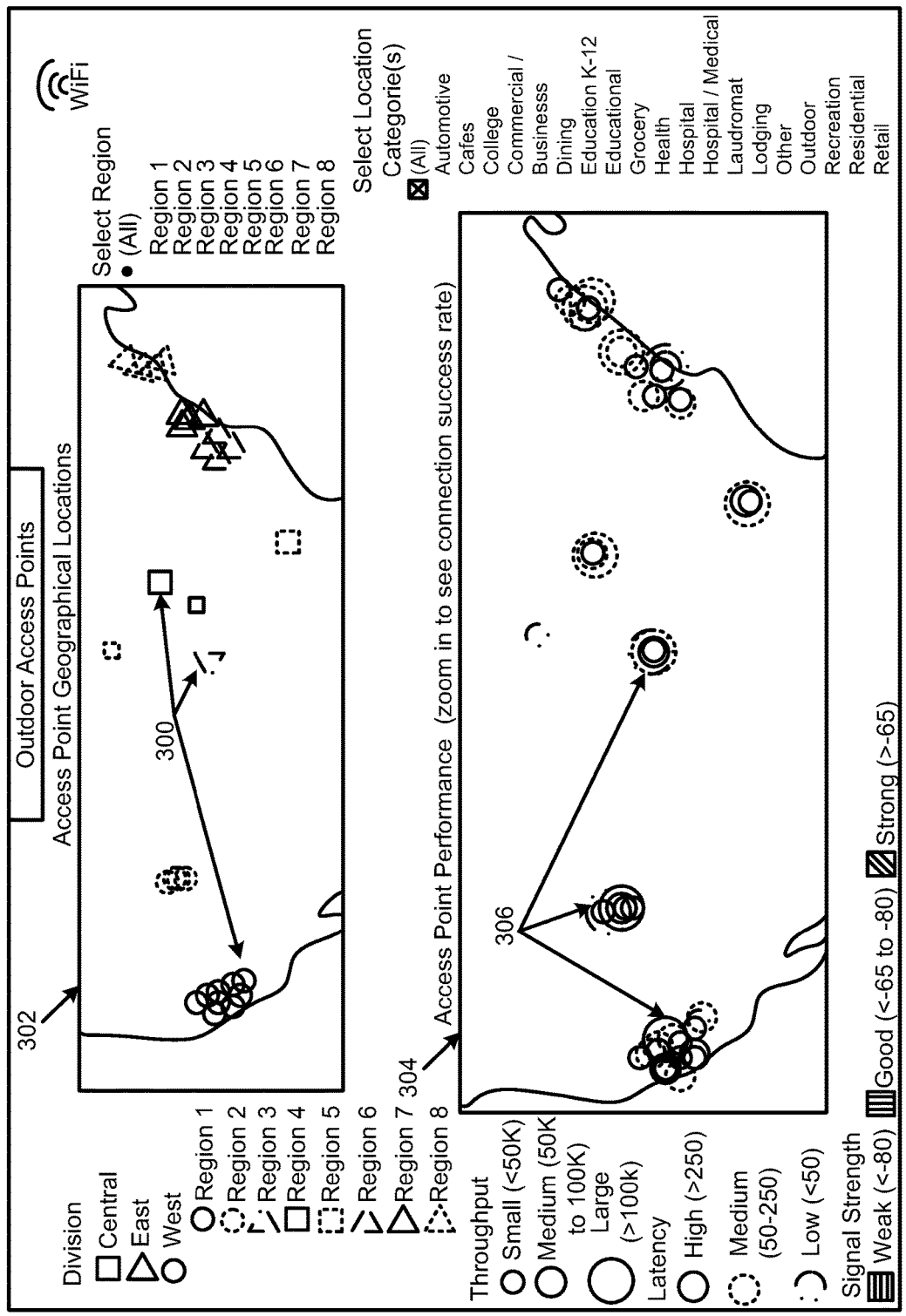
FIG. 3 illustrates a graphical user interface display for access point geographical and performance insights for a service operations center, according to an example of the present disclosure.

FIG. 3 illustrates a graphical user interface display for access point geographical and performance insights for a service operations center, according to an example of the present disclosure.

Referring to FIGS. 1A and 3, at the access point drill down level (e.g., based on a selection of the option 212 of FIG. 2), the insight generator 120 may generate insights by plotting each of the access points 112*a-b* vis-à-vis their longitude and latitude information (e.g., see 300 at FIG. 3) in a geographical window 302. The information displayed, for example, at 300 may represent a summary of performance at different levels (e.g., national, division, region, county, etc.), to facilitate visualization of the performance at different thresholds (e.g., based on color coding, circle size, etc.).

The insight generator 120 may generate a performance window 304 to display insights regarding the dependent variables of throughput, latency, and/or signal strength (and/or login time) to differentiate the network performance of the access points (e.g., latency between 1 ms to 50 ms may be classified in the 'Low' range, while latency>250 ms may be classified in the 'High' range). Thus, the insight generator 120 may determine underperforming access points based on the real-time access point data received from the data aggregator 118. The underperforming access points may be access points classified in the 'High' latency range.

According to an example, as shown at 306, throughput performance may be depicted by a size of an access point's circle, latency performance may be depicted by a color of an access point's circle, and signal strength, which is averaged over a zip code region, may be depicted by a color of a zip code field for the access point based on a legend on the left-hand panel of the performance window 304. The performance window 304 may be zoomed in, panned, and access points from different regions may be compared by using the performance window and filter controls on the right-side panel of the performance window 304.

The map charts of FIG. 3 (denoted "Access Point Geographical Locations" and "Access Point Performance") may be zoomed in, panned, different regions compared together etc., by using map and filter controls. A user may select a region (e.g., Region 1) from a plurality of regions on the right-side panel of the geographical window 302 to visualize access points in the selected region. Further, the user may select a location category (e.g., commercial/business) from a plurality of categories on the right-side panel of the performance window 304. According to an example, the performance window 304 may then display a zoomed view of the performance of access points in Region 1 that pertain to the commercial/business location category. Based on this functionality, the data related to latency, login time, signal strength, and throughput may be visually depicted to facilitate an understanding thereof.

With respect to FIG. 3, the view of FIG. 3 may represent a "single pane of glass, where information from many systems may be brought together in a single screen to thus eliminate the need for a user to login to multiple systems. In certain cases where there may be too many graphs for a user to review, by assigning points to specific events in a graph (i.e., login took more than two seconds=1 point) and then determining the number of points over a given time period (i.e., number of points in a day for server X), a threshold may be set for an acceptable number of points. For example, green=0 to 3, yellow=3 to 10, red=10+ . . . , etc. Based on this breakdown, a user may look at the color of the server to identify which server should be looked at in more detail as opposed to looking at a graph that may not be easy to decipher. The number of points may also be trended over time to gain insight into performance degradations that are not apparent to a human observer. For example, the difference between 64 points on day 1, 66 on day 2, 69 on day 3 when observing the raw graphs may not be easily seen by a user, but when plotted in a line, show a clear increase that potentially hints at performance degradation that may be addressed.

Figure 4:
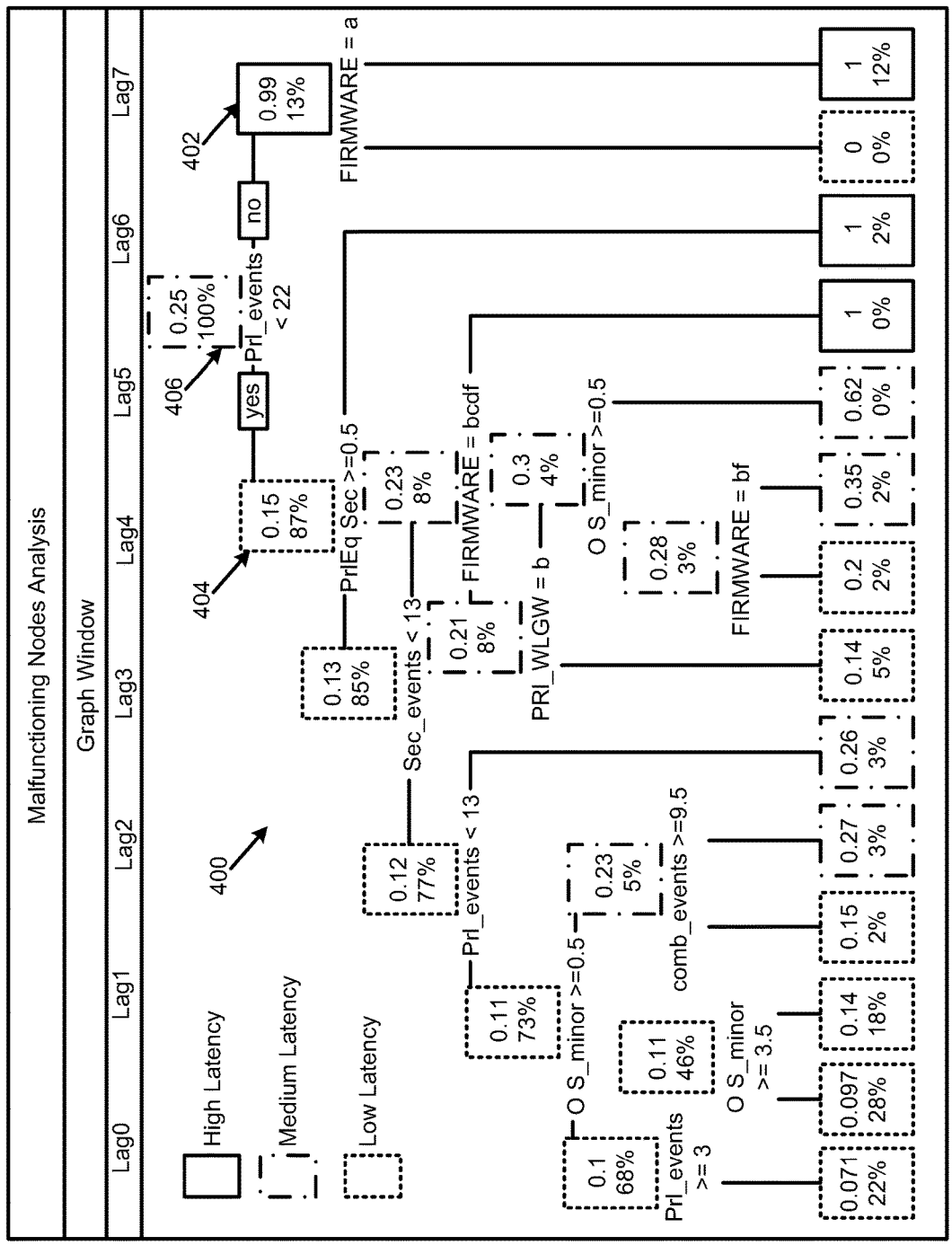
FIG. 4 illustrates a graphical user interface display including a decision tree for a malfunctioning node analysis for a network operations center, according to an example of the present disclosure.

FIG. 4 illustrates a graphical user interface display for a malfunctioning node analysis for a network operations center, according to an example of the present disclosure.

Referring to FIGS. 1A and 4, the insight generator 120 may generate insights by providing advanced visualization (e.g., as disclosed herein with respect to FIGS. 2 and 3) to let a user, such as a service operations center user, drill-down to low performing access points. In this regard, with respect to possible solutions related to low performing access points, the insight generator 120 may generate insights to provide a network operations center user with a statistical and/or advanced modeling solution to perform machine learning operations on the data, to analyze the root cause or reasons for any problems (e.g., a malfunctioning node), and to focus on resolving and/or optimizing such identified problems based on access point failure prediction.

With respect to root cause analysis of malfunctioning nodes, the performance monitor and predictor 122 may constantly (or at predetermined time intervals) monitor the performance of network nodes. Any change in a network node configuration (e.g., firmware, location, etc.), or other factors such as wired LAN gateway events, etc., may cause different nodes to function in different manners. As disclosed herein, according to an example, the performance monitor and predictor 122 may generate a real-time updating decision tree (e.g., at 400) to provide an efficient way of diagnosing why certain nodes marked, for example, in a predetermined color such as red (e.g., at 402, with red being depicted as a solid border), are not performing as well as other nodes marked in another color, such as green (e.g., at 404, with green being depicted as a dashed border). For the example of FIG. 4, since the decision tree is refreshed at every six hours interval, Lag 0 may include the decision tree on the most recent six hours of data, Lag 1 may include the decision tree on a previous six hours interval, etc. Subsequently, older 6 hours interval decision trees may be displayed for analysis. Each node depicted in FIG. 4 may represent all of the sessions, and all of the attributes related to the sessions. For example, the node at 406 may represent 100% of the sessions, and all of the attributes, such as, latency, throughput, device configuration, etc., related to the sessions. The node at 406 may then be divided at 402 and 404 based on high latency versus low latency sessions based on a particular variable (e.g., Pri_events). Thus, the decision tree may divide the data based on the statistically most important variable for the time interval. For this example, at 402, the statistically most important variable for the time interval may include firmware of the access point. At 404, the statistically most important variable for the time interval may include a determination of whether the make of the primary and secondary wireless LAN gateway is the same and of a specific type. In this manner, referring to FIG. 4, the root cause analysis may provide a network operations center user timely inputs on how a network is responding to corrective actions being taken. For example, based on a firmware update, a new decision tree may be generated by the performance monitor and predictor 122 to provide the network operations center user a timely input on how the network is responding to the firmware update.

Figure 5:
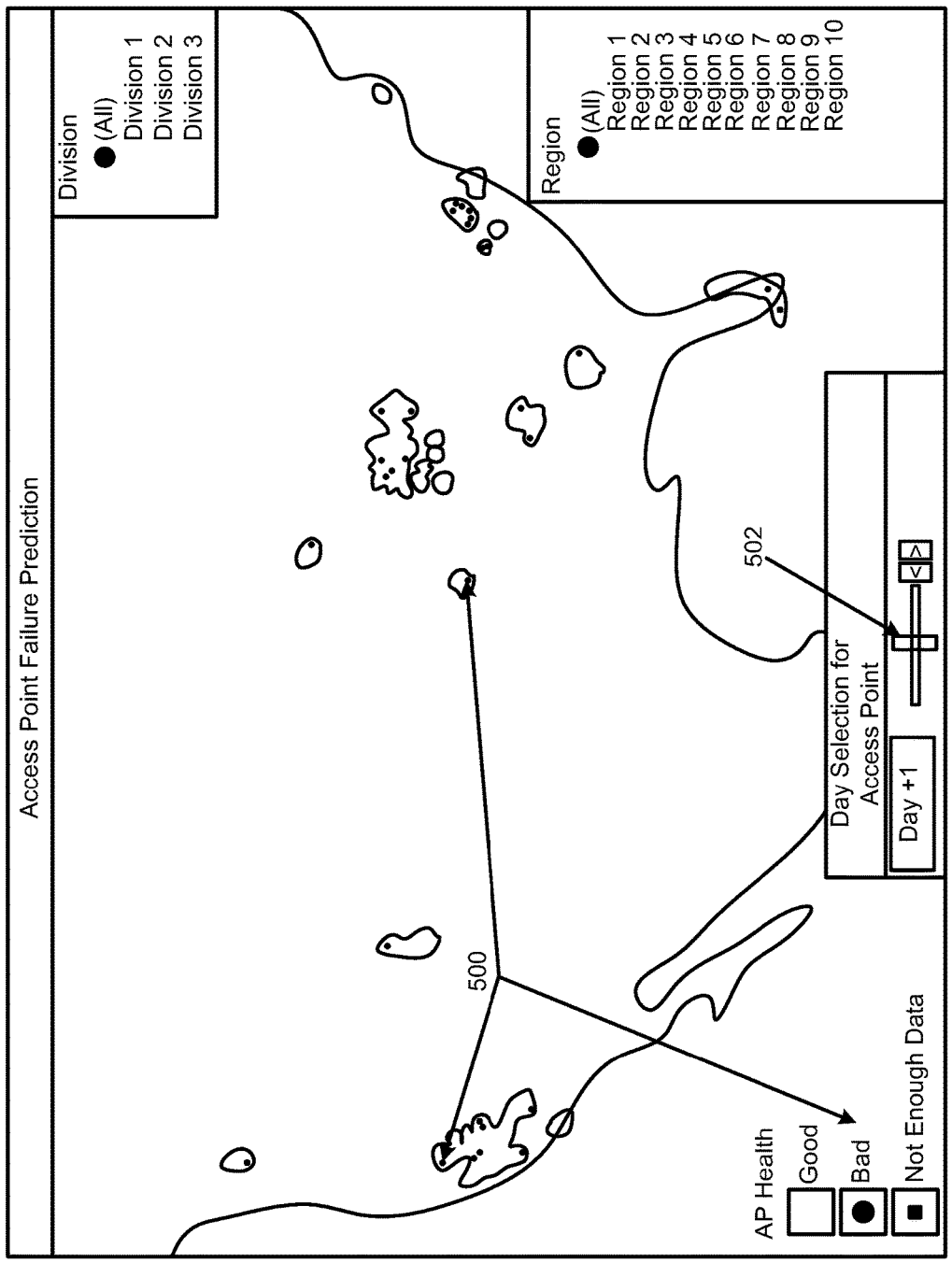
FIG. 5 illustrates a graphical user interface display for an access point failure prediction for a network operations center, according to an example of the present disclosure.

FIG. 5 illustrates a graphical user interface display for an access point failure prediction for a network operations center, according to an example of the present disclosure.

Referring to FIGS. 1A and 5, with respect to access point failure prediction, the performance monitor and predictor 122 may statistically predict when a particular access point may fail (e.g., result in 100% failed connections) based, for example, on an historical success rate of connections on the particular access point. In this regard, the insight generator 120 may generate insights to provide a network operations center user with a graphical view of how the different access points may perform, for example, in the next twenty-four hours (or another future time duration) using historical connection quality information, for example, of the past forty-eight hours (or another past time duration). In this regard, referring to FIG. 5, an access point may be marked, for example, in a red color (indicated as a circle in FIG. 5), to indicate a very high likelihood of failure (e.g., shown as "bad" at 500 in FIG. 5) in the next twenty-four hours, and may require immediate attention (e.g., firmware upgrade, active load management, device replacement, etc.). The network operations center user may also be provided with an option to select a particular day for the evaluation at 502 (e.g., "Day +1" for a next day access point failure prediction).

Design and Development, Deployment, and Implementation of Decision Tree Model 124

As described herein, the root cause analysis of malfunctioning nodes may be performed based on machine learning to generate a decision tree. The first division of data in a decision tree may represent a primary cause for a malfunctioning node, and further divisions of the data may represent further causes for malfunctioning nodes. A combination of all rules in a decision tree may thus provide insights for the root causes of issues.

Root cause analysis of malfunctioning nodes may include model design and development for the decision tree model 124, deployment of the decision tree model 124, and implementation of the decision tree model 124. Model design and development for the decision tree model 124 may include variable identification and selection, data cleaning and pre-processing, iterations of the decision tree model 124 on the required variables, and statistical evaluation of the decision tree model 124. Deployment of the decision tree model 124 may include implementation of the decision tree model 124 for a predetermined time duration (e.g., the last forth-eight hours of data) to identify root causes of high latency. With respect to deployment of the decision tree model 124, based on the heat map based decision tree as disclosed herein, a combination of different reasons for high latency may be identified. Further, with respect to deployment of the decision tree model 124, the decision tree model 124 may depict, for example, distance from access point, firmware and wireless LAN gateway type, etc., as primary reasons for high latency. Implementation of the decision tree model 124 may include creation of a predetermined number of decision trees for a predetermined time duration (e.g., eight decision trees for the past forty-eight hours at six hour time intervals). Such a series of decision trees may facilitate identification of trends related to where and what is causing high latency.

FIG. 6 illustrates a table of independent variables for predicting connection latency for root cause analysis of malfunctioning nodes, according to an example of the present disclosure.

Referring to FIGS. 1A and 6, with respect to model design and development for root cause analysis of malfunctioning nodes, in order to identify root causes of high latency for a predetermined time duration and a predetermined time interval (e.g., for the past forty-eight hours at six hour time intervals), the performance monitor and predictor 122 may iteratively generate the decision tree model 124 to explain the root causes of high latency.

With respect to data preparation and validation for the decision tree model 124, the performance monitor and predictor 122 may prepare session level data. Various performance variables may be included in cleaning of the dataset. For example, variables such as identification (ID) variables and "null" variables may be removed from the dataset. Further, variables with relatively no or insignificant correlation with a dependent variable (e.g., latency) may be removed from the dataset. The data may include variables on performance indicators such as latency, signal, bandwidth, and hardware type such as gateway, firmware, cable modem model (CM_model). Referring to FIG. 6, dependent variable Latency_Flag may be classified as '1' if latency for a session is greater than a predetermined value (e.g., latency>200), and otherwise, the Latency_Flag may be classified as '0'. Referring to FIG. 6, calculated variables such as Primary_Eq_Secondary may be created to identify change in latency if there is a change in gateway type.

With respect to creation of transformed variables for the decision tree model 124, based on data preparation and validation for the decision tree model 124 as disclosed herein, a remaining list of variables may include variables which are all significantly related to the latency, and include a clear trend which may be placed into the decision tree model 124. Further, the remaining list of variables may include variables which have been treated for outliers (e.g., floored and capped at minimum and maximum values), and missing values may be left with a standardized variable which may be entered into an equation without errors. The equation may be derived using a logistic regression model. For example, as disclosed herein, FIG. 13 includes all of the variables for the equation. The equation may change based on client infrastructure set up and available data.

With respect to variable selection for the decision tree model 124, the variables 2-14 listed in FIG. 6 may be considered as independent variables for predicting the connection latency by the performance monitor and predictor 122. Referring to FIG. 6, the independent variables may include Primary Event, Secondary Event, Primary Eq Secondary, Type of Operating System, AP_ACCOUNT_STATUS, CM_LAST_POLL, CM_MODEL, Combined_rating, State, FIRMWARE, Primary_rating, SSID_ENABLED, and WLGW_TYPE. The independent variables 2-14 may be described as shown in FIG. 6. With respect to the independent variables 2-14 of FIG. 6, based on multiple iterations of the decision tree model 124, several of the independent variables may be discarded on the basis of statistical checks. The machine learning technique disclosed herein may identify the variables based on statistical significance of each variable, and ability to divide the data into homogeneous groups of dependent variables.

Referring to FIG. 6, an access point may be configured to include a primary and secondary wireless LAN gateway. In the event that the primary wireless LAN gateway is busy, the access point may redirect the data packet to the secondary wireless LAN gateway. A primary event variable may include a number of long login events as measured at the primary wireless LAN gateway for that particular session. Similarly a secondary event variable may include the number of long login events at the secondary wireless LAN gateway for that session. A wireless LAN gateway may be of different types. For example, if a particular wireless LAN gateway is malfunctioning, all gateways of the same type may also be malfunctioning. In the event a session has both the wireless LAN gateways of the same type, the access point may not be able to avoid the impact of such a performance degradation. In contrast, another access point which includes different types of primary and secondary wireless LAN gateways may route packets to the other type of gateway in the event the first type of gateway is causing poor network performance.

With respect to the decision tree model 124, the performance monitor and predictor 122 may use recursive partitioning (Rpart) to build the decision tree model 124, and to represent the decision tree model 124 as a decision tree (e.g., see example of decision tree of FIG. 4). The decision tree may be generated by first determining the single independent variable which best divides the data into two groups. The performance monitor and predictor 122 may separate the data into two groups (i.e., to form two sub-groups), and then apply the data division process separately to each sub-group, and so on recursively until the sub-groups either reach a minimum size or until no further improvement may be made. According to an example, a minimum size may represent 0.4% of the dataset size, and no further improvement may represent no significant difference in the event rate for two branches.

The performance monitor and predictor 122 may use the decision tree model 124 in conjunction with a heat map to plot the decision tree (e.g., as shown in FIG. 4, where the decision tree is plotted using different colors). The decision tree may facilitate understanding of the reasons for high latency, with each node of the decision tree being identified, for example, based on color coding as disclosed herein. The decision tree may be used to highlight the source and/or reasons of high latency for a predetermined time duration (e.g., for the past forty-eight hours). Based on the heat map based decision tree, the performance monitor and predictor 122 may identify a combination of different reasons which cause high latency.

According to an example, the insight generator 120 may generate a display of a plurality of the decision trees (e.g., eight decision trees for the example of the decision tree model 124 that determines decision trees every six hours for a forty-eight hour time duration). The composition of the eight decision trees may be completely different (or some of the decision trees may be similar) for each six hour time window since there may be a high latency periods for some of the decision trees, and low latency periods for other decision trees, which may alter the depth and structure of the decision trees.

According to an example, the decision trees may include a predetermined depth (e.g., a depth of seven as shown in FIG. 4), with the root node being counted as depth zero. The decision tree model 124 may be used to create a decision tree with rules, which may be plotted by the insight generator 120 using a heat map.

FIG. 7 illustrates a decision tree model for root cause analysis of malfunctioning nodes, according to an example of the present disclosure.

Referring to FIGS. 1A and 7, with respect to the decision tree model 124 of FIG. 7, decision trees may be refreshed (i.e., a new decision tree may be generated) at a predetermine time interval (e.g., every 6 hours). Session level data for a most recent time interval (e.g., past 6 hours) may be stored for the fourteen most important predictors as disclosed herein with reference to FIG. 6. If data related to root cause analysis of malfunctioning nodes is refreshed, all of the decision trees may be updated.

Figure 8:
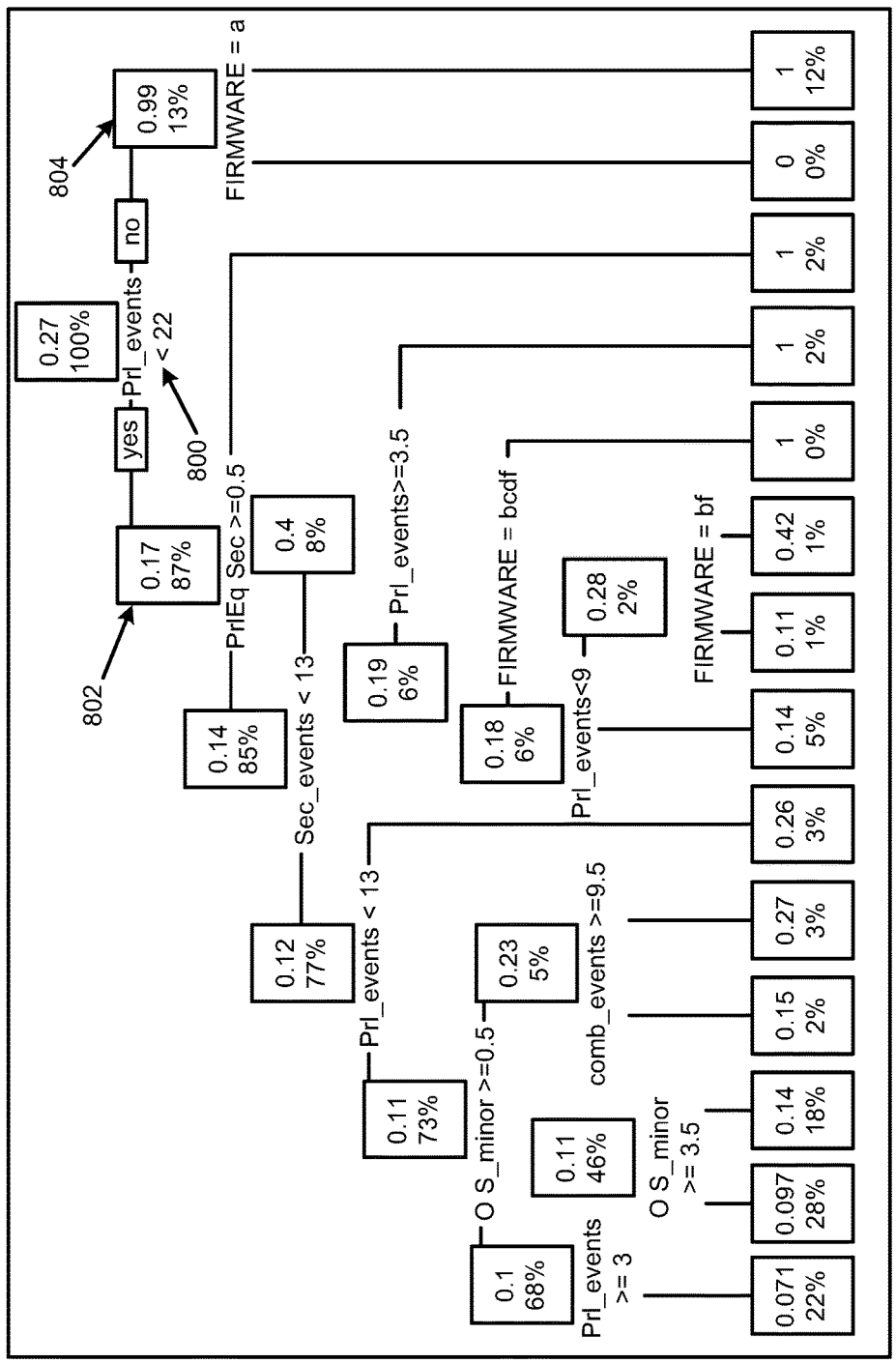
FIG. 8 illustrates a decision tree for root cause analysis of malfunctioning nodes, according to an example of the present disclosure.

FIG. 8 illustrates a decision tree for root cause analysis of malfunctioning nodes, according to an example of the present disclosure.

Referring to FIGS. 1A and 8, the decision tree model 124 of FIG. 7 may be used to generate a decision tree (which may be plotted by the insight generator 120 using a heat map) as shown in FIG. 8. Referring to FIGS. 7 and 8, according to an example, as shown at 700 in FIG. 7, the independent variable related to primary events may determine whether a number of primary events are less than twenty-two. As shown at 800 in FIG. 8, the evaluation of this independent variable may correspond to the decision tree nodes at 802 and 804. In this manner, other nodes in the decision tree of FIG. 8 may be determined for the other independent variables evaluated as shown in FIG. 7. The variables actually used for the decision tree construction may be identified at 702 in the decision tree model 124 of FIG. 7. With respect to FIGS. 7 and 8, the data and/or columns may change based on availability of data.

Design and Development, Deployment, and Implementation of Access Point Failure Prediction Model 126

As disclosed herein, with respect to access point failure prediction, the logistic regression equation may provide a score for each access point (as described herein with reference to FIG. 13). This score may be used to predict failure of an access point. For example, the top 5% of access points with the highest scores may be considered as high failure probability, where the threshold of 5% may change based on client infrastructure failure rate.

Access point failure prediction may include model design and development for the access point failure prediction model 126, deployment of the access point failure prediction model 126, and implementation of the access point failure prediction model 126. Model design and development for the access point failure prediction model 126 may include data preparation and validation, creation of transformed variables, access point failure prediction model 126 iterations on the required variables, final model design and fitment on the development sample, and statistical checks. Deployment of the access point failure prediction model 126 may include post statistical evaluation of the access point failure prediction model 126, use of a predetermined time duration (e.g., past two days) of actual data to predict a future (e.g., next day's) access point health, development of the access point failure prediction model 126 in a programming language, such as R, and designation of an access point as "bad" if >50% (or another user-defined percentage) of the sessions on the access point are bad. Implementation of the access point failure prediction model 126 may include generation of displays of access point health, for example, for Day−1, Day−0, and Day+1, and generation of displays of access point health at various levels (e.g., division, region, etc.).

FIG. 9 illustrates an initial run output for determining an access point failure prediction model for access point failure prediction, according to an example of the present disclosure.

Referring to FIGS. 1A and 9, with respect to the access point failure prediction model 126, the performance monitor and predictor 122 may iteratively generate the access point failure prediction model 126, with an objective of the access point failure prediction model 126 including predicting an access point health for a predetermined future time duration (e.g., one day) in advance by using data for a predetermined past time duration (e.g., last two days of data).

With respect to data preparation and validation, the performance monitor and predictor 122 may perform data preparation and validation in a similar manner as disclosed herein with respect to the decision tree model 124. According to an example, the performance monitor and predictor 122 may use data for a predetermined time duration (e.g., three months) for the analysis to generate the access point failure prediction model 126. In order to train the access point failure prediction model 126, according to an example, access points where at least two sessions have been received on Day−1 (i.e., a previous day) and Day−0 (i.e., the current day), and four sessions have been received on Day+1 (e.g., the next day following the current day) may be used. According to an example, an access point may be considered "bad" if more than 50% of the sessions (or another user-defined percentage of sessions) are bad. In this regard, the performance monitor and predictor 122 may identify a dependent variable (e.g., BAD AP), and analyze its relation with all independent variables used for the prediction. According to an example, the significant independent variables and predictor are listed in FIG. 13. For all entries present in the dataset, the dependent variable (e.g., BAD AP) may be mapped to each independent variable. Apart from performance variables, a plurality of transformed variables may be created to accurately predict access point performance.

With respect to model iterations for the access point failure prediction model 126, the performance monitor and predictor 122 may generate an error matrix and a receiver operating characteristic (ROC) curve to analyze a stability and robustness of the access point failure prediction model 126. In this regard, the performance monitor and predictor 122 may determine a best fit model that predicts failure most accurately, for example, by checking all possible combinations of independent variables. Different variables may be included and/or excluded in each iteration of the access point failure prediction model 126 to determine whether any change is observed and how the access point failure prediction model 126 operates compared to a previous iteration.

Referring to FIGS. 1A and 9, an example of an initial run output for determining the access point failure prediction model 126 is illustrated. In this regard, FIG. 10 illustrates an error matrix for the initial run output for the access point failure prediction model of FIG. 9, according to an example of the present disclosure.

Referring to FIGS. 1A, 9, and 10, with respect to the initial run output for determining the access point failure prediction model 126, the relatively low Pseudo R-Square of 0.1638 (on a scale of 0 to 1) as shown at 900 may be used to conclude that the access point failure prediction model 126 in its current form may be relatively inaccurate in predicting a "bad" access point in the future.

Referring to FIGS. 1A and 11, an example of a further run output (e.g., a $20^{th}$ run output) for determining the access point failure prediction model 126 is illustrated, according to an example of the present disclosure. In this regard, FIG. 12 illustrates an error matrix for the further run output for the access point failure prediction model of FIG. 11, according to an example of the present disclosure.

Referring to FIGS. 1A, 11, and 12, with respect to the further run output for determining the access point failure prediction model 126, the relatively higher Pseudo R-Square of 0.6022 (on a scale of 0 to 1) as shown at 1100 may be used to conclude that the access point failure prediction model 126 in its current form may still be relatively inaccurate in predicting a "bad" access point in the future. For example, compared to the access point failure prediction model 126 of FIG. 9, the access point failure prediction model 126 of FIG. 11 may include the use of two new variables (AP_Tunnel Type and AP_COS type at 1102), where these two variables may improve the accuracy and stability of the access point failure prediction model 126. The variables (AP_Tunnel Type and AP_COS type at 1102) may be selected based on statistical significance determined by the logistic regression technique, where AP_Tunnel Type may represent the make of an access point tunnel, and AP_COS may represent the access point class of service. The access point failure prediction model 126 of FIG. 11 may predict a "bad" access point with approximately 50% accuracy (i.e., one out of two predicted access points will actually be "bad").

Referring to FIGS. 1A and 13, an example of a yet further run output (e.g., a 50$^{th}$ run output) for determining the access point failure prediction model 126 is illustrated, according to an example of the present disclosure. In this regard, FIG. 14 illustrates an error matrix for the yet further run output for the access point failure prediction model of FIG. 13, according to an example of the present disclosure.

Referring to FIGS. 1A, 13, and 14, with respect to the yet further run output for determining the access point failure prediction model 126, the high Pseudo R-Square of 0.7924 (on a scale of 0 to 1) as shown at 1300 may be used to conclude that the access point failure prediction model 126 in its current form may accurately predict a "bad" access point in the future. For example, compared to the access point failure prediction models 126 of FIGS. 9 and 11, the access point failure prediction model 126 of FIG. 13 may include the use of the variables (change_Rx, change_BANDWIDTH, change_LATENCY, AP_Tunnel_Flag, and AP_COS_Flag at 1302), where these variables may improve the accuracy and stability of the access point failure prediction model 126. The variables at 1302 may be selected based on statistical significance determined by the logistic regression technique. The variables used for the access point failure prediction model 126 of FIG. 13 may represent change variables, which capture change in matric values from Day_0 to Day_1. During data exploration by the performance monitor and predictor 122, these variables may show strong correlation with the dependent variable. The access point failure prediction model 126 of FIG. 13 may predict a "bad" access point with approximately 90% accuracy (i.e., nine out of ten predicted access points will actually be "bad"). The R-square for the logistic model is 0.79, where a model with R-square above 0.7 may be considered an acceptable model for deployment.

Figure 15:
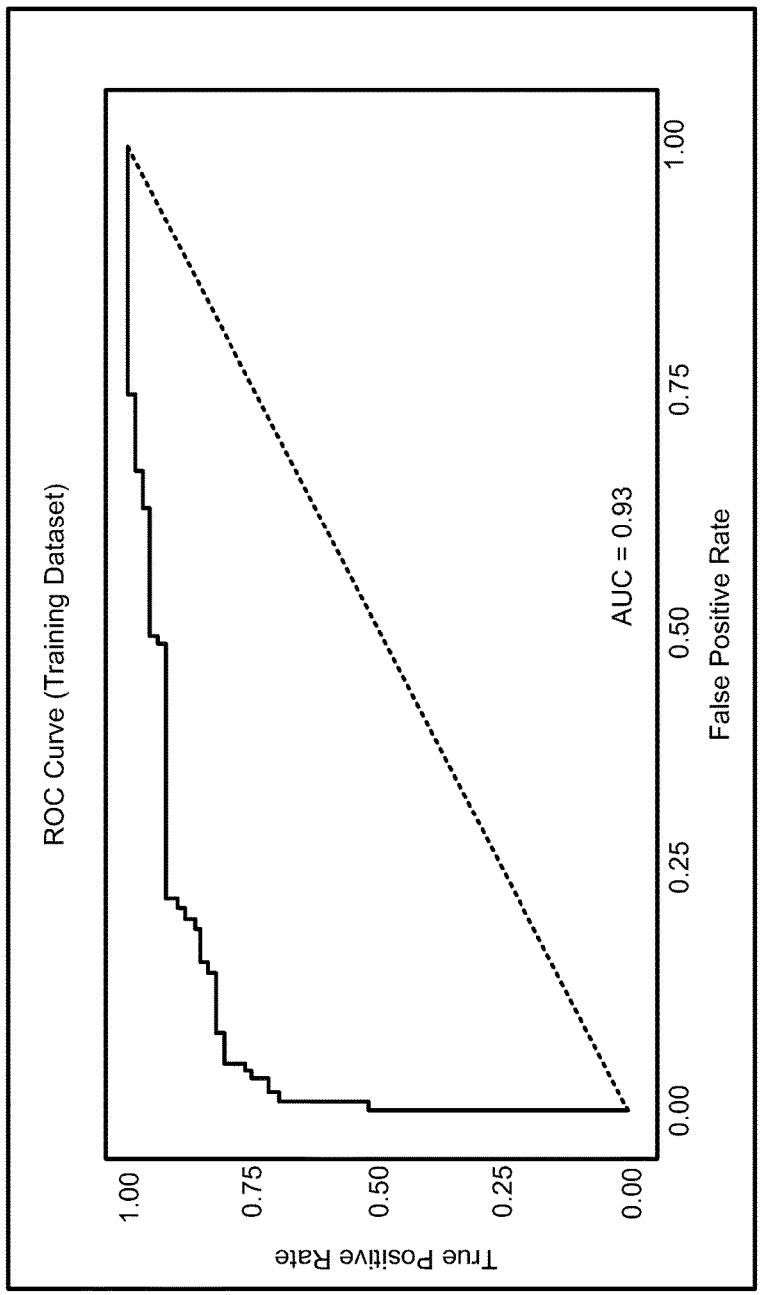
FIG. 15 illustrates a training dataset receiver operating characteristic curve for the access point failure prediction model of FIG. 13, according to an example of the present disclosure.

FIG. 15 illustrates a training dataset receiver operating characteristic curve for the access point failure prediction model of FIG. 13, according to an example of the present disclosure. Further, FIG. 16 illustrates a test dataset receiver operating characteristic curve for the access point failure prediction model of FIG. 13, according to an example of the present disclosure.

Figure 16:
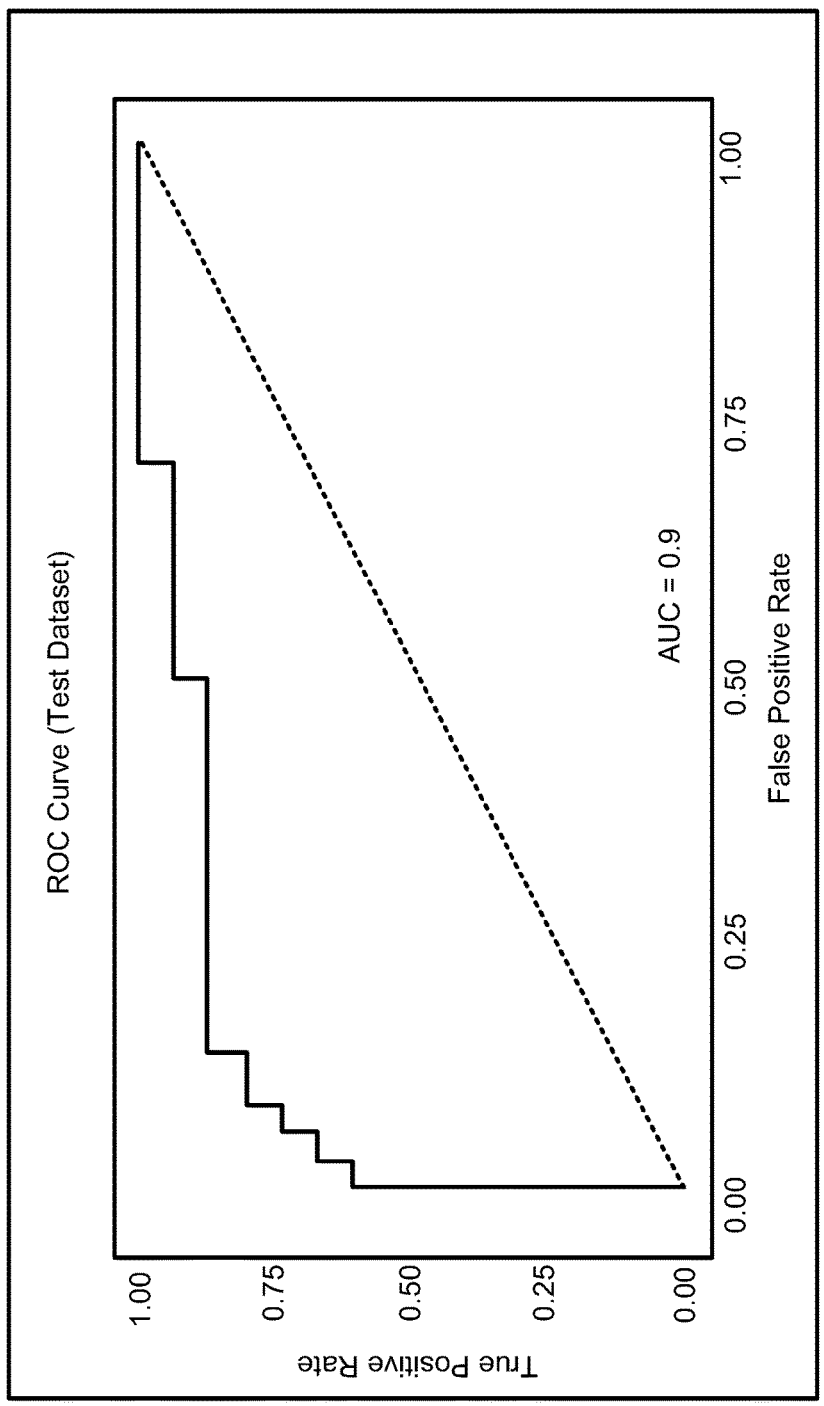
FIG. 16 illustrates a test dataset receiver operating characteristic curve for the access point failure prediction model of FIG. 13, according to an example of the present disclosure.

Referring to FIGS. 1A, 15, and 16, the access point failure prediction model 126 of FIG. 13 may predict at least two out of three "bad" access points with high accuracy. In this regard, the receiver operating characteristic curves of FIGS. 15 and 16 may generally accurately predict "bad" access points with high accuracy.

Figure 17:
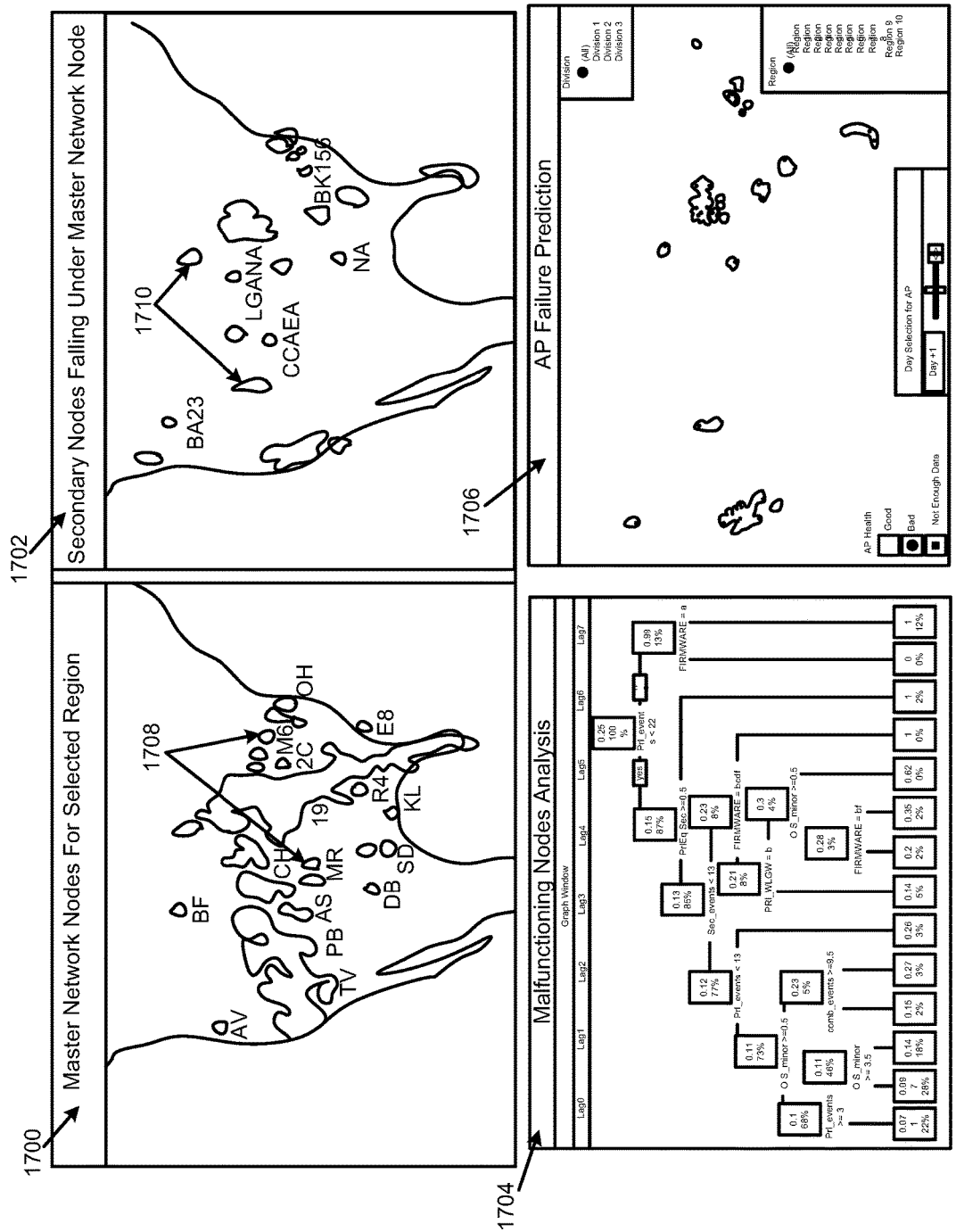
FIG. 17 illustrates a graphical user interface display for master network nodes, secondary network nodes, a malfunctioning node analysis, and an access point failure prediction for a network operations center, according to an example of the present disclosure.

FIG. 17 illustrates a graphical user interface display for master network nodes, secondary network nodes, a malfunctioning node analysis, and an access point failure prediction for a network operations center, according to an example of the present disclosure.

Referring to FIGS. 1A and 17, the graphical user interface display for the master network nodes at 1700, the secondary network nodes at 1702, the malfunctioning node analysis at 1704, and the access point failure prediction at 1706 may represent combined views that may be generated by the insight generator 120. For example, the graphical user interface display for the master network nodes at 1700 and the secondary network nodes at 1702 may be provided for access point and node health monitoring, where indicators, such as different colors, may be used to indicate a real-time percentage of pingable access points connected at each master and secondary node. The master node may be described as a part of a wired network that is connected to a wireless LAN gateway. The master node may be further connected to secondary nodes in a tree network topology format. The secondary nodes may be connected to access points/home networks. The graphical user interface display for the malfunctioning node analysis at 1704 may provide node and access point level decision trees to isolate causes leading to poor performance and possible customer experience degradation. Further, the graphical user interface display for the access point failure prediction at 1706 may provide failure prediction based, for example, on a predetermined number of previous days (e.g., two days) of access point performance.

Figure 18:
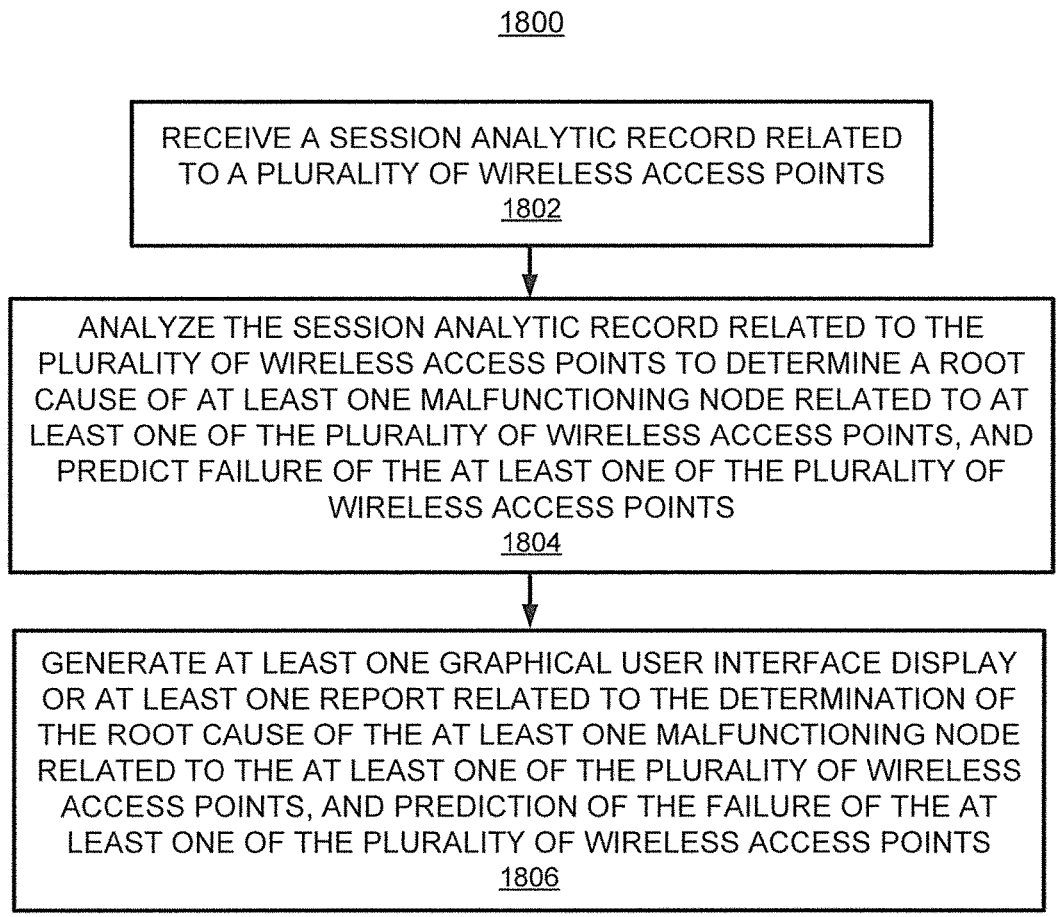
FIG. 18 illustrates a flow diagram of a method for Wi-Fi access point performance management, according to an example of the present disclosure.

FIGS. 18 and 19 respectively illustrate flowcharts of methods 1800 and 1900 for Wi-Fi access point performance management, according to examples. The methods 1800 and 1900 may be implemented on the system 102 described above with reference to FIGS. 1A-17 by way of example and not limitation. The methods 1800 and 1900 may be practiced in other systems.

Referring to FIGS. 1A-18, and particularly FIGS. 1A and 18, at block 1802, the method 1800 may include receiving (e.g., by the performance monitor and predictor 122) a session analytic record 142 related to a plurality of wireless access points 112a-b.

At block 1804, the method 1800 may include analyzing (e.g., by the performance monitor and predictor 122) the session analytic record 142 related to the plurality of wireless access points 112a-b to determine a root cause of at least one malfunctioning node related to at least one of the plurality of wireless access points 112a-b, and predict failure of the at least one of the plurality of wireless access points 112a-b.

At block 1806, the method 1800 may include generating (e.g., by the insight generator 120) at least one graphical user interface display or at least one report related to the determination of the root cause of the at least one malfunctioning node related to the at least one of the plurality of wireless access points 112a-b, and prediction of the failure of the at least one of the plurality of wireless access points 112a-b.

According to an example, the at least one graphical user interface display or the at least one report related to the determination of the root cause of the at least one malfunctioning node related to the at least one of the plurality of wireless access points 112*a-b* may include a decision tree (e.g., see FIG. 4) that identifies the root cause of the at least one malfunctioning node related to the at least one of the plurality of wireless access points 112*a-b*.

According to an example, the decision tree may include color coding (e.g., see FIG. 4) to identify different latency ranges of the at least one malfunctioning node related to the at least one of the plurality of wireless access points 112*a-b*.

According to an example, the root cause of the at least one malfunctioning node related to the at least one of the plurality of wireless access points 112*a-b* may be based on (i.e., determined according to at least one of the listed factors, some combination of the factors, or exclusively according to the list of factors) at least one of a determination of a number of events on a wireless LAN gateway related to the at least one of the plurality of wireless access points 112*a-b* as a primary session, a determination of a number of events on the wireless LAN gateway related to the at least one of the plurality of wireless access points 112*a-b* as a secondary session, a determination of whether a primary wireless LAN gateway is identical to a secondary wireless LAN gateway, and a determination of a type of firmware installed on the at least one of the plurality of wireless access points 112*a-b*.

According to an example, the at least one graphical user interface display or the at least one report related to the prediction of the failure of the at least one of the plurality of wireless access points 112*a-b* may include a plot (e.g., see FIG. 5) of the at least one of the plurality of wireless access points 112*a-b* relative to longitude and latitude information related to the at least one of the plurality of wireless access points 112*a-b*. The plot of the at least one of the plurality of wireless access points 112*a-b* may include color coding to identify different types of predictions of the failure of the at least one of the plurality of wireless access points 112*a-b*.

According to an example, the at least one graphical user interface display related to the prediction of the failure of the at least one of the plurality of wireless access points 112*a-b* may include an option (e.g., at 502) to select a performance status of the at least one of the plurality of wireless access points 112*a-b* for a current time duration and a future time duration.

According to an example, the method 1800 may further include aggregating (e.g., by the data aggregator 118) data from a plurality of data sources related to the at least one of the plurality of wireless access points 112*a-b* to generate the session analytic record 142. The plurality of data sources may include at least one of device generated session data that represents Wi-Fi session records obtained from a plurality of wireless devices connected to the at least one of the plurality of wireless access points 112*a-b*, wireless LAN gateway data that represents gateway logs related to the at least one of the plurality of wireless access points 112*a-b*, and access point, node, and core health data that represents health check logs related to the at least one of the plurality of wireless access points 112*a-b*.

According to an example, the performance monitor and predictor 122 may determine the root cause of the at least one malfunctioning node related to the at least one of the plurality of wireless access points 112*a-b* by implementing recursive partitioning to determine a decision tree model 124 to generate a decision tree that identifies the root cause of the at least one malfunctioning node related to the at least one of the plurality of wireless access points 112*a-b*.

According to an example, the performance monitor and predictor 122 may implement recursive partitioning to determine the decision tree model 124 to generate the decision tree that identifies the root cause of the at least one malfunctioning node related to the at least one of the plurality of wireless access points 112*a-b* by identifying, from a plurality of possible independent variables, a reduced set of independent variables (e.g., see FIG. 7) that is significantly related to latency of the at least one malfunctioning node related to the at least one of the plurality of wireless access points 112*a-b*, and using the identified reduced set of the independent variables to determine the decision tree model 124 to generate the decision tree that identifies the root cause of the at least one malfunctioning node related to the at least one of the plurality of wireless access points 112*a-b*.

According to an example, the performance monitor and predictor 122 may implement recursive partitioning to determine the decision tree model 124 to generate the decision tree that identifies the root cause of the at least one malfunctioning node related to the at least one of the plurality of wireless access points 112*a-b* by identifying, from a plurality of possible independent variables, an independent variable that divides data (see FIGS. 4 and 8) from the session analytic record 142 into two groups, and applying data division to each group of the two groups until a predetermined condition (e.g., minimum size) is met.

According to an example, the performance monitor and predictor 122 may predict failure of the at least one of the plurality of wireless access points 112*a-b* by implementing machine learning of a predetermined time duration (e.g., past three months) of the session analytic record 142 related to the plurality of wireless access points 112*a-b*, analyzing, based on the machine learning of the predetermined time duration of the session analytic record 142 related to the plurality of wireless access points 112*a-b*, a further predetermined time duration (e.g., Day−1 and Day−0) of the session analytic record 142 related to the plurality of wireless access points 112*a-b*, and predicting, based on the analysis of the further predetermined time duration of the session analytic record 142 related to the plurality of wireless access points 112*a-b*, failure of the at least one of the plurality of wireless access points 112*a-b* for a future predetermined time duration (e.g., Day+1) associated with the further predetermined time duration.

According to an example, the future predetermined time duration (e.g., Day+1) may represent a time duration for which there is no available session analytic record 142 related to the plurality of wireless access points 112*a-b*.

According to an example, the performance monitor and predictor 122 may predict failure of the at least one of the plurality of wireless access points 112*a-b* by implementing logistic regression to determine an access point failure prediction model 126 to predict failure of the at least one of the plurality of wireless access points 112*a-b*.

According to an example, the performance monitor and predictor 122 may analyze the session analytic record 142 related to the plurality of wireless access points 112*a-b* to predict failure of the at least one of the plurality of wireless access points 112*a-b* by determining whether a percentage of sessions related to the at least one of the plurality of wireless access points 112*a-b* are below a session quality metric (e.g., >50% (or another user-defined percentage) of the sessions on the access point are bad)), and in response to a determination that the percentage of sessions related to the at least one of the plurality of wireless access points 112*a-b* are below the session quality metric, designating the at least one of the plurality of wireless access points 112*a-b* as failed.

According to an example, the performance monitor and predictor 122 may analyze the session analytic record 142 related to the plurality of wireless access points 112a-b to predict failure of the at least one of the plurality of wireless access points 112a-b by analyzing a relationship of a dependent variable (e.g., the dependent variable (e.g., BAD AP)) related to a failed wireless access point to a plurality of independent variables related to the at least one of the plurality of wireless access points 112a-b, and iteratively determining, from the plurality of independent variables, a set of independent variables that accurately maps to the dependent variable related to the failed wireless access point.

According to an example, the method 1800 may further include tracking (e.g., by the model deployer 128), based on a second decision tree, a result of a modification related to an attribute of the at least one of the plurality of wireless access points 112a-b, by comparing the second decision tree to a first decision tree that represents the at least one malfunctioning node related to the at least one of the plurality of wireless access points 112a-b prior to the modification related to the attribute (e.g., firmware, OS, primary event, secondary event, etc.) of the at least one of the plurality of wireless access points 112a-b.

Referring to FIGS. 1A-17 and 19, and particularly FIGS. 1A and 19, at block 1902, the method 1900 may include receiving a session analytic record 142 related to a plurality of wireless access points 112a-b.

At block 1904, the method 1900 may include analyzing the session analytic record 142 related to the plurality of wireless access points 112a-b to determine a root cause of at least one malfunctioning node related to at least one of the plurality of wireless access points 112a-b.

At block 1906, the method 1900 may include generating at least one graphical user interface display or at least one report that includes a decision tree that identifies the root cause of the at least one malfunctioning node related to the at least one of the plurality of wireless access points 112a-b.

According to an example, a method for Wi-Fi access point performance management may include receiving a session analytic record 142 related to a plurality of wireless access points 112a-b, and analyzing the session analytic record 142 related to the plurality of wireless access points 112a-b to predict failure of at least one of the plurality of wireless access points 112a-b. Further, the method for Wi-Fi access point performance management may include generating at least one graphical user interface display or at least one report related to the prediction of the failure of the at least one of the plurality of wireless access points 112a-b by plotting the at least one of the plurality of wireless access points 112a-b relative to longitude and latitude information related to the at least one of the plurality of wireless access points 112a-b, and coding (e.g., by color) the plot of the at least one of the plurality of wireless access points 112a-b to identify different types of predictions of the failure of the at least one of the plurality of wireless access points 112a-b.

Figure 20:
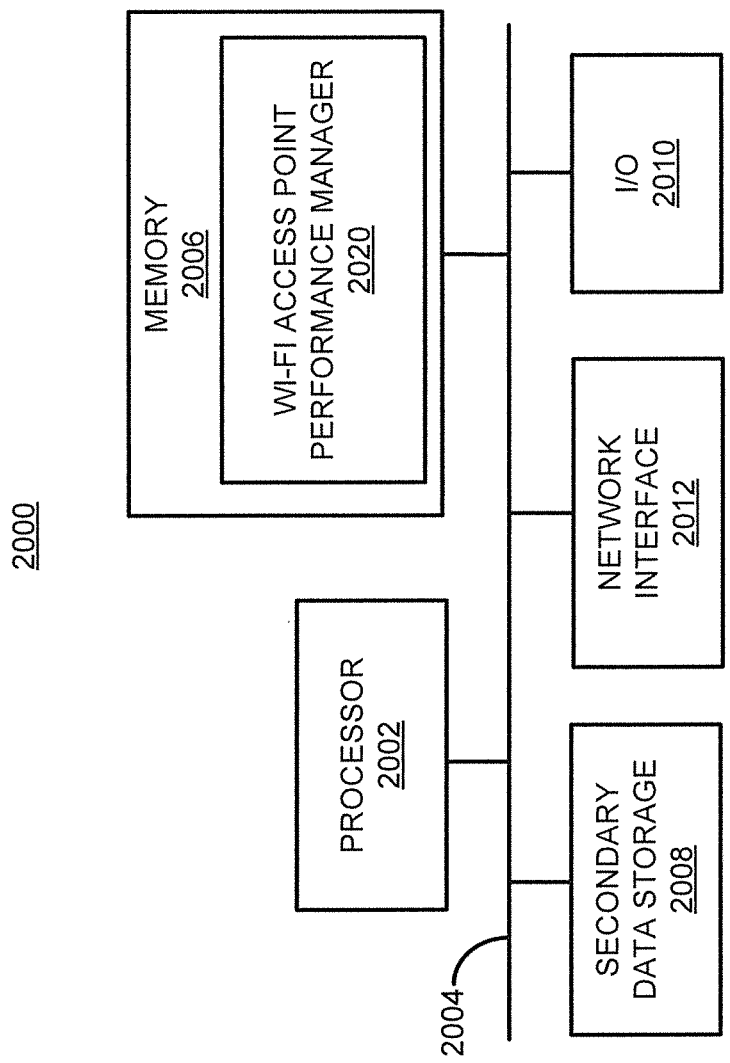
FIG. 20 illustrates a computer system, according to an example of the present disclosure.

FIG. 20 shows a computer system 2000 that may be used with the examples described herein. The computer system may represent a generic platform that includes components that may be in a server or another computer system. The computer system 2000 may be used as a platform for the system 102. The computer system 2000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 2000 may include a processor 2002 that may implement or execute machine readable instructions performing some or all of the methods, functions and other processes described herein. Commands and data from the processor 2002 may be communicated over a communication bus 2004. The computer system may also include a main memory 2006, such as a random access memory (RAM), where the machine readable instructions and data for the processor 2002 may reside during runtime, and a secondary data storage 2008, which may be non-volatile and stores machine readable instructions and data. The memory and data storage are examples of computer readable mediums. The memory 2006 may include an Wi-Fi access point performance manager 2020 including machine readable instructions residing in the memory 2006 during runtime and executed by the processor 2002. The Wi-Fi access point performance manager 2020 may include the elements of the system 102 shown in FIGS. 1A-17.

The computer system 2000 may include an I/O device 2010, such as a keyboard, a mouse, a display, etc. The computer system may include a network interface 2012 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A Wi-Fi access point performance management system comprising:
    a data aggregator, executed by the at least one hardware processor, to
        aggregate data from a plurality of data sources related to the at least one of a plurality of wireless access points to generate a session analytic record related to the plurality of wireless access points, wherein the data from the plurality of data sources includes device generated session data that represents Wi-Fi session records obtained from a plurality of wireless devices connected to the at least one of the plurality of wireless access points;
    a performance monitor and predictor, executed by at least one hardware processor, to
        analyze the session analytic record related to the plurality of wireless access points to
            determine a root cause of at least one malfunctioning node related to the at least one of the plurality of wireless access points by recursive partitioning to generate a decision tree that identifies the root cause of the at least one malfunctioning node related to the at least one of the plurality of wireless access points, wherein the root cause is based on a determination of a type of firmware installed on the at least one of the plurality of wireless access points,
            predict failure of the at least one of the plurality of wireless access points by implementing logistic regression to determine an access point failure prediction model to predict failure of the at least one of the plurality of wireless access points by determining whether a percentage of sessions related to the at least one of the plurality of wireless access points are below a session quality metric, and in response to a determination that the percentage of sessions related to the at least one of the plurality of wireless access points are below the session quality metric, designating the at least one of the plurality of wireless access points as failed, determine a problem that has been identified by the decision tree and the access point failure prediction model with respect to at least one of nodes related to the plurality of wireless access points, or the plurality of wireless access points, and implement at least one corrective action to rectify the problem, wherein the corrective action includes at least one of firmware upgrade, re-routing of traffic to another node, re-setting of a wireless access point, or re-setting of an associated component, and when the corrective action is a firmware upgrade, a new decision tree is generated after the firmware upgrade;

an insight generator, executed by the at least one hardware processor, to generate at least one graphical user interface display or at least one report related to the determination of the root cause of the at least one malfunctioning node related to the at least one of the plurality of wireless access points, and prediction of the failure of the at least one of the plurality of wireless access points; and a non-transitory computer readable medium storing machine readable instructions that when executed by the at least one hardware processor cause the at least one hardware processor to:

control operations of a network including the at least one malfunctioning node and the at least one of the plurality of wireless access points based on the determination of the root cause of the at least one malfunctioning node related to the at least one of the plurality of wireless access points, and prediction of the failure of the at least one of the plurality of wireless access points.

2. The Wi-Fi access point performance management system according to claim 1, wherein the at least one graphical user interface display or the at least one report related to the determination of the root cause of the at least one malfunctioning node related to the at least one of the plurality of wireless access points includes the decision tree that identifies the root cause of the at least one malfunctioning node related to the at least one of the plurality of wireless access points.

3. The Wi-Fi access point performance management system according to claim 2, wherein the decision tree includes color coding to identify different latency ranges of the at least one malfunctioning node related to the at least one of the plurality of wireless access points.

4. The Wi-Fi access point performance management system according to claim 1, wherein the root cause of the at least one malfunctioning node related to the at least one of the plurality of wireless access points is based on at least one of a determination of a number of events on a wireless LAN gateway related to the at least one of the plurality of wireless access points as a primary session, a determination of a number of events on the wireless LAN gateway related to the at least one of the plurality of wireless access points as a secondary session, or a determination of whether a primary wireless LAN gateway is identical to a secondary wireless LAN gateway.

5. The Wi-Fi access point performance management system according to claim 1, wherein the at least one graphical user interface display or the at least one report related to the prediction of the failure of the at least one of the plurality of wireless access points includes a plot of the at least one of the plurality of wireless access points relative to longitude and latitude information related to the at least one of the plurality of wireless access points, wherein the plot of the at least one of the plurality of wireless access points includes color coding to identify different types of predictions of the failure of the at least one of the plurality of wireless access points.

6. The Wi-Fi access point performance management system according to claim 1, wherein the at least one graphical user interface display related to the prediction of the failure of the at least one of the plurality of wireless access points includes an option to select a performance status of the at least one of the plurality of wireless access points for a current time duration and a future time duration.

7. The Wi-Fi access point performance management system according to claim 1, wherein the plurality of data sources further include at least one of wireless LAN gateway data that represents gateway logs related to the at least one of the plurality of wireless access points, or access point, node, and core health data that represents health check logs related to the at least one of the plurality of wireless access points.

8. The Wi-Fi access point performance management system according to claim 1, wherein the performance monitor and predictor is to determine the root cause of the at least one malfunctioning node related to the at least one of the plurality of wireless access points by implementing recursive partitioning to determine a decision tree model to generate the decision tree that identifies the root cause of the at least one malfunctioning node related to the at least one of the plurality of wireless access points.

9. The Wi-Fi access point performance management system according to claim 8, wherein the performance monitor and predictor is to implementing recursive partitioning to determine the decision tree model to generate the decision tree that identifies the root cause of the at least one malfunctioning node related to the at least one of the plurality of wireless access points by identifying, from a plurality of possible independent variables, a reduced set of independent variables that is significantly related to latency of the at least one malfunctioning node related to the at least one of the plurality of wireless access points, and using the identified reduced set of the independent variables to determine the decision tree model to generate the decision tree that identifies the root cause of the at least one malfunctioning node related to the at least one of the plurality of wireless access points.

10. The Wi-Fi access point performance management system according to claim 8, wherein the performance monitor and predictor is to implementing recursive partitioning to determine the decision tree model to generate the decision tree that identifies the root cause of the at least one malfunctioning node related to the at least one of the plurality of wireless access points by identifying, from a plurality of possible independent variables, an independent variable that divides data from the session analytic record into two groups, and applying data division to each group of the two groups until a predetermined condition is met.

11. The Wi-Fi access point performance management system according to claim 1, wherein the performance monitor and predictor is to predict failure of the at least one of the plurality of wireless access points by implementing machine learning of a predetermined time duration of the session analytic record related to the plurality of wireless access points, analyzing, based on the machine learning of the predetermined time duration of the session analytic record related to the plurality of wireless access points, a further predetermined time duration of the session analytic record related to the plurality of wireless access points, and predicting, based on the analysis of the further predetermined time duration of the session analytic record related to the plurality of wireless access points, failure of the at least one of the plurality of wireless access points for a future predetermined time duration associated with the further predetermined time duration.

12. The Wi-Fi access point performance management system according to claim 11, wherein the future predetermined time duration represents a time duration for which there is no available session analytic record related to the plurality of wireless access points.

13. The Wi-Fi access point performance management system according to claim 1, wherein the performance monitor and predictor is to analyze the session analytic record related to the plurality of wireless access points to predict failure of the at least one of the plurality of wireless access points by determining whether a percentage of sessions related to the at least one of the plurality of wireless access points are below a session quality metric, and in response to a determination that the percentage of sessions related to the at least one of the plurality of wireless access points are below the session quality metric, designating the at least one of the plurality of wireless access points as failed.

14. The Wi-Fi access point performance management system according to claim 1, wherein the performance monitor and predictor is to analyze the session analytic record related to the plurality of wireless access points to predict failure of the at least one of the plurality of wireless access points by analyzing a relationship of a dependent variable related to a failed wireless access point to a plurality of independent variables related to the at least one of the plurality of wireless access points, and iteratively determining, from the plurality of independent variables, a set of independent variables that accurately maps to the dependent variable related to the failed wireless access point.

15. The Wi-Fi access point performance management system according to claim 1, further comprising:

a model deployer, executed by the at least one hardware processor, to track, based on a second decision tree, a result of a modification related to an attribute of the at least one of the plurality of wireless access points, by comparing the second decision tree to a first decision tree that represents the at least one malfunctioning node related to the at least one of the plurality of wireless access points prior to the modification related to the attribute of the at least one of the plurality of wireless access points.

16. A method for Wi-Fi access point performance management, the method comprising:

aggregating, by at least one hardware processor, data from a plurality of data sources related to at least one of a plurality of wireless access points to generate a session analytic record related to the plurality of wireless access points, wherein the data from the plurality of data sources includes device generated session data that represents Wi-Fi session records obtained from a plurality of wireless devices connected to the at least one of the plurality of wireless access points;

analyzing, by the at least one hardware processor, the session analytic record related to the plurality of wireless access points to determine a root cause of at least one malfunctioning node related to the at least one of the plurality of wireless access points by recursive partitioning to generate a decision tree that identifies the root cause of the at least one malfunctioning node related to the at least one of the plurality of wireless access points, wherein the root cause is based on a determination of a type of firmware installed on the at least one of the plurality of wireless access points;

predicting, by the at least one hardware processor, failure of the at least one of the plurality of wireless access points by implementing logistic regression to determine an access point failure prediction model to predict failure of the at least one of the plurality of wireless access points by determining whether a percentage of sessions related to the at least one of the plurality of wireless access points are below a session quality metric, and in response to a determination that the percentage of sessions related to the at least one of the plurality of wireless access points are below the session quality metric, designating the at least one of the plurality of wireless access points as failed;

determining, by the at least one hardware processor, a problem that has been identified by the decision tree and the access point failure prediction model with respect to at least one of nodes related to the plurality of wireless access points, or the plurality of wireless access points;

implementing, by the at least one hardware processor, at least one corrective action to rectify the problem, wherein the corrective action includes at least one of firmware upgrade, re-routing of traffic to another node, resetting of a wireless access point, or re-setting of an associated component, and when the corrective action is a firmware upgrade, a new decision tree is generated after the firmware upgrade; and generating, by the at least one hardware processor, at least one graphical user interface display or at least one report related to the determination of the root cause of the at least one malfunctioning node related to the at least one of the plurality of wireless access points, and related to the prediction of the failure of the at least one of the plurality of wireless access points.

17. The method for Wi-Fi access point performance management according to claim 16, wherein analyzing the session analytic record related to the plurality of wireless access points to determine the root cause of the at least one malfunctioning node related to the at least one of the plurality of wireless access points further comprises at least one of:

determining a type of operating system related to the at least one of the plurality of wireless access points;

determining an account status related to the at least one of the plurality of wireless access points; or determining a combined rating of a wireless LAN gateway related to the at least one of the plurality of wireless access points.

18. A non-transitory computer readable medium having stored thereon machine readable instructions for Wi-Fi access point performance management, the machine readable instructions when executed cause a computer system to:

aggregate data from a plurality of data sources related to at least one of a plurality of wireless access points to generate a session analytic record related to the plurality of wireless access points, wherein the data from the plurality of data sources includes device generated session data that represents Wi-Fi session records obtained from a plurality of wireless devices connected to the at least one of the plurality of wireless access points;

analyze the session analytic record related to the plurality of wireless access points to determine a root cause of at least one malfunctioning node related to the at least one of the plurality of wireless access points by recursive partitioning to generate a decision tree that identifies the root cause of the at least one malfunctioning node related to the at least one of the plurality of wireless access points, wherein the root cause is based on a determination of a type of firmware installed on the at least one of the plurality of wireless access points;

predict failure of the at least one of the plurality of wireless access points by implementing logistic regression to determine an access point failure prediction model to predict failure of the at least one of the plurality of wireless access points by determining whether a percentage of sessions related to the at least one of the plurality of wireless access points are below a session quality metric, and in response to a determination that the percentage of sessions related to the at least one of the plurality of wireless access points are below the session quality metric, designating the at least one of the plurality of wireless access points as failed;

determine a problem that has been identified by the decision tree and the access point failure prediction model with respect to at least one of nodes related to the plurality of wireless access points, or the plurality of wireless access points;

implement at least one corrective action to rectify the problem, wherein the corrective action includes at least one of firmware upgrade, re-routing of traffic to another node, re-setting of a wireless access point, or re-setting of an associated component, and when the corrective action is a firmware upgrade, a new decision tree is generated after the firmware upgrade;

generate at least one graphical user interface display or at least one report related to the determination of the root cause of the at least one malfunctioning node related to the at least one of the plurality of wireless access points, and related to the prediction of the failure of the at least one of the plurality of wireless access points by plotting the at least one of the plurality of wireless access points relative to longitude and latitude information related to the at least one of the plurality of wireless access points; and code the plot of the at least one of the plurality of wireless access points to identify different types of predictions of the failure of the at least one of the plurality of wireless access points.

19. The non-transitory computer readable medium according to claim 18, wherein the machine readable instructions to analyze the session analytic record related to the plurality of wireless access points, further comprise machine readable instructions to:

implement machine learning of a predetermined time duration of the session analytic record related to the plurality of wireless access points;

analyze, based on the machine learning of the predetermined time duration of the session analytic record related to the plurality of wireless access points, a further predetermined time duration of the session analytic record related to the plurality of wireless access points; and predict, based on the analysis of the further predetermined time duration of the session analytic record related to the plurality of wireless access points, failure of the at least one of the plurality of wireless access points for a future predetermined time duration associated with the further predetermined time duration.

\* \* \* \* \*